United States Patent [19]

Seraji

[11] Patent Number: 4,860,215

[45] Date of Patent: Aug. 22, 1989

[54] METHOD AND APPARATUS FOR ADAPTIVE FORCE AND POSITION CONTROL OF MANIPULATORS

[75] Inventor: Homayoun Seraji, La Cresenta, Calif.

[73] Assignee: California Institute of Technology, Pasadena, Calif.

[21] Appl. No.: 35,061

[22] Filed: Apr. 6, 1987

[51] Int. Cl.$^4$ ...................... G06F 15/46; G05B 19/42
[52] U.S. Cl. .................................. 364/513; 364/163; 364/165; 901/9; 901/15; 901/45; 901/34
[58] Field of Search ................ 364/513, 148, 161–165; 318/568; 901/9, 15, 45, 34

[56] References Cited

U.S. PATENT DOCUMENTS

| | | | |
|---|---|---|---|
| 4,547,858 | 10/1985 | Horak | 364/513 |
| 4,580,229 | 4/1986 | Koyama et al. | 364/513 |
| 4,621,332 | 11/1986 | Sugimoto et al. | 364/513 |
| 4,725,942 | 2/1988 | Osuka | 364/513 |

Primary Examiner—Allen MacDonald
Attorney, Agent, or Firm—Jackson & Jones

[57] ABSTRACT

The present invention discloses systematic methods and apparatus for the design of real time controllers. Real-time control employs adaptive force/position by use of feedforward and feedback controllers, with the feedforward controller being the inverse of the linearized model of robot dynamics and containing only proportional-double-derivative terms is disclosed. The feedback controller, of the proportional-integral-derivative type, ensures that manipulator joints follow reference trajectories and the feedback controller achieves robust tracking of step-plus-exponential trajectories, all in real time.

The adaptive controller includes adaptive force and position control within a hybrid control architecture. The adaptive controller, for force control, achieves tracking of desired force setpoints, and the adaptive position controller accomplishes tracking of desired position trajectories. Circuits in the adaptive feedback and feedforward controllers are varied by adaptation laws.

28 Claims, 11 Drawing Sheets

RESPONSE OF CONTACT FORCE $P_x(t)$ UNDER ADAPTIVE CONTROL

RESPONSE OF POSITION $y(t)$ UNDER ADAPTIVE CONTROL

RESPONSE OF CONTACT FORCE $P_x(t)$ IN CASE 1

RESPONSE OF POSITION $y(t)$ IN CASE 1

RESPONSE OF FORCE $P_x(t)$ TO SUDDEN STIFFNESS CHANGE IN CASE 2

RESPONSE OF FORCE $P_x(t)$ TO SURFACE MOVEMENT IN CASE 3

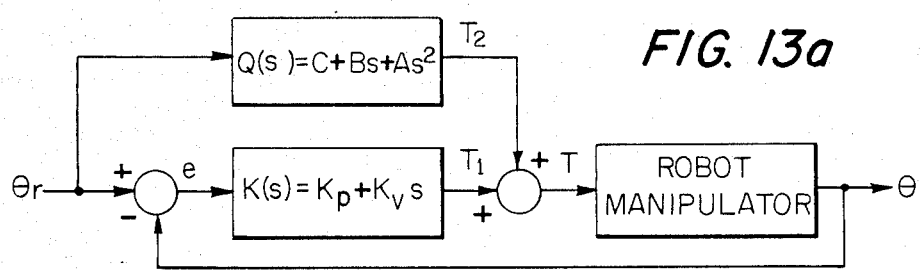
FIG. 13a
FIG. 11b
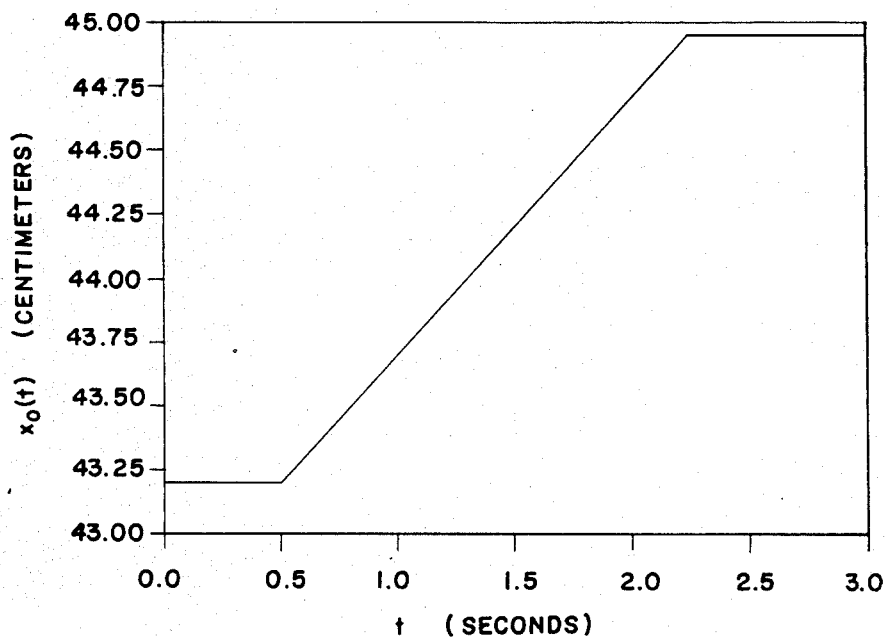
POSITION OF REACTION SURFACE $x_0(t)$ IN CASE 3
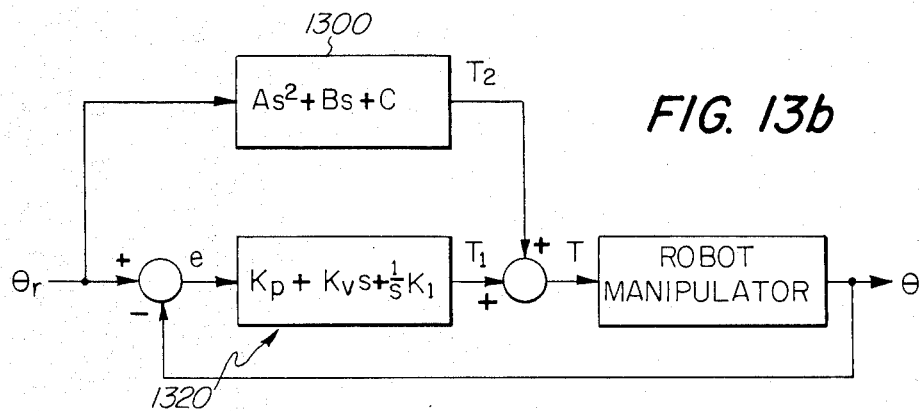
FIG. 13b RESPONSE OF FORCE $P_x(t)$ IN COMPLIANT MOTION IN CASE 4

POSITION OF REACTION SURFACE $x_0(t)$ IN CASE 4

METHOD AND APPARATUS FOR ADAPTIVE FORCE AND POSITION CONTROL OF MANIPULATORS

ORIGIN OF THE INVENTION

The invention described herein was made in the performance of work under a NASA Contract and is subject to the provisions of Public Law 96517 (35 USC 202) in which the contractor has elected to retain title.

BACKGROUND OF THE INVENTION

1. Field of the Invention

The field of this invention relates to control systems for robotic manipulators and more particularly relates to adaptive force and position controllers combined in a hydrid control system.

2. Background of the Invention

Hybrid control systems, i.e., those systems which together supply signals to control the position of, and force exerted by, a robotic manipulator simultaneously are known. Such systems are required because most manipulators are operated in the presence of environmental constraints, and certain degrees-of-freedom are lost for motion due to the environmental constraints. For example, when the manipulator makes contact with the environment, the contact forces must be controlled in the constraint directions, while the positions are controlled simultaneously in the free directions.

The problem of manipulator control in a constrained environment has been investigated by several researchers. See, for example D. E. Whitney, "Historical Perspective and State of the Art in Robot Force Control," *Proc. IEEE Intern. Conf. on Robotics and Automation,* pp. 262-268, St. Louis, MO, 1985. At present, three major conceptual approaches exist for simultaneous position and force control. Paul and Shimano (R. P. Paul and B. Shimano, "Compliance and Control," *Proc. Joint Aut. Control Conf.,* pp. 694-699, San Francisco, CA, 1976) suggest a method which uses certain joints for position control while the remaining joints are used for force control. Salisbury (J. K. Salisbury, "Active Stiffness Control of a Manipulator in Cartesian Coordinates," *Proc. IEEE Conf. on Decision and Control,* pp. 95-100, Albuquerque, NM, 1980) puts forward a technique for controlling the end-effector stiffness characteristics in the Cartesian space. Raibert and Craig (M. H. Raibert and J. J. Craig, "Hybrid Position/Force Control of Manipulators," *ASME J. Dyn Systems, Measurement and Control, Vol.* 102, pp. 126-133, 1981) proposed a conceptual architecture, based on the analysis of Mason for "hydrid control" (M. T. Mason, "Compliance and Force Control for Computer Controlled Manipulators," *IEEE Trans. Systems, Man and Cybernetics, SMC*11(6), pp. 418-432, 1981). Hybrid control allows forces to be controlled in the constraint directions by a force controller, while simultaneously controlling positions in the free direction by a position controller. Raibert and Craig, however, do not prescribe a general and systematic method for the design of position and force controllers. Nevertheless, hybrid control has gained considerable popularity over the other two alternatives for simultaneous position and force control. Hybrid control has been used extensively in the literature. See, for example, H. Zhang and R. P. Paul, "Hybrid Control of Robot Manipulators," *Proc. IEEE Intern. Conf. on Robotics and Automation,* pp. 602-607, St. Louis, MO, 1985; H. West and H. Asada, "A Method for the Design of Hybrid Position/Force Controllers for Manipulators Constrained by Contact with the Environment," *Proc. IEEE Intern. Conf. on Robotics and Automation,* pp. 251-259, St. Louis, MO, 1985; P. G. Backes, G. G. Leininger and C. H. Chung, "Real-Time Cartesian Coordinate Hybrid Control of a PUMA 560 Manipulator," *Proc. IEEE Intern. Conf. on Robotics and Automation,* pp. 608-613, St. Louis, MO, 1985; P. G. Backes, G. G. Leininger and C. H. Chung, "Joint Self-Tuning with Cartesian Setpoints," *ASME J. Dyn. Systems, Measurement and Control,* Vol 108, pp. 146-150, 1986; O. Khatib and J. Burdick, "Motion and Force Control of Robot Manipulators," *Proc. IEEE Intern. Conf. on Robotics and Automation,* pp. 1381-1386, San Francisco, CA, 1986; T. Yoshikawa, "Dynamic Hybrid Position/Force Control of Robot Manipulators," *Proc. IEEE Intern. Conf. on Robotics and Automation,* pp. 1393-1398, San Francisco, CA, 1986; A. J. Koivo, "Force-Position-Velocity Control with Self-Tuning for Robotic Manipulators," *Proc. IEEE Intern. Conf. on Robotics and Automation,* pp. 1563-1568, San Francisco, CA, 1986; C. C. Nguyen, F. J. Pooran and T. Premack, "Control of Robot Manipulator Compliance," *Proc. Intern. Symp. on Robot Manipulators,* Albuquerque, NM, 1986; O. Khatib, "Dynamic Control of Manipulators in Operational Space," *Proc.* 6th IFToMM Congress on Theory of Machines and Mechanisms, pp. 1128-1131, New Delhi, India, 1983 (Whiley, New Delhi); S. D. Eppinger and W. P. Seering, "On Dynamic Models of Robot Force Control," *Proc. IEEE Intern. Conf. on Robotics and Automation,* pp. 29-34, San Francisco, CA 1986; and J. W. Gilbart, R. V. Monopoli and C. F. Price, "Improved Convergence and Increased Flexibility in the Design of Model Reference Adaptive Control Systems," *Proc. IEEE Conf. on Decision and Control,* pp. IV 3.1-3.10, Austin, TX, 1970.

Position sensors and force sensors are well known and actually measure the position and force at a controlled end effector. The end effector behavior, whether position alone, or position and force, results from voltages applied to motors that run the joints in a robotic arm. In Raibert and Craig, the hybrid control system requires coordinate transformations of the measurements to develop a feedback term, which through very extensive inverse Jacobian computations, controls the motors in the joints of the robotic arm by independent servo control loops. Such an approach requires knowledge of those motors parameters and other robotic arm parameter values, as well. Furthermore, independent servo control loops, as suggested by Raibert and Craig, do not accommodate cross coupling of position and force.

This invention, in distinction from Raibert and Craig, is a truly adaptive controller for force and position. Since the adaptive controller senses force and position in Cartesian space and formulates driving voltages which achieve the Cartesian force and position, advance knowledge of the robotic arm, joint motor parameter and environment values is not necessary. A highly stable and adaptive real-time controller is achieved by this invention.

SUMMARY OF THE INVENTION

The present invention discloses systematic methods and apparatus for the design of adaptive force and position controllers within a hybrid control architecture. The adaptive force controller achieves tracking of desired force setpoints, and the adaptive position controller accomplishes tracking of desired position trajectories. Force and position controller gains are varied by adaptation laws and the controllers are computationally fast and suitable for on-line implementation with high sampling rates. The novel adaptive controller of this invention comprises adaptive feedback and feedforward controllers. These controllers are capable of compensating for dynamic cross-couplings that exist between position and force control loops. The adaptive controllers do not require knowledge of the complex dynamic model or parameter values of the manipulator or the environment. The force and position controllers are linear and stable and generate real-time signals which vary and compensate for system non-linearities in order to achieve a desired position/force response.

There are certain key differences between the invention's approach and the conventional hybrid control approach of Raibert and Craig. Firstly, in the present invention, the force or position control problems are formulated in the Cartesian space with the end-effector Cartesian forces as the manipulated variables; whereas in Raibert and Craig, the problems are formulated in the joint space. The invention's formulation results in computational improvement since inverse Jacobians are not needed in the controllers. Secondly, the invention operates on the measured variables so as to produce the position and force variables that need to be controlled; whereas in Raibert and Craig, a selection matrix and its complement are used after formation of tracking errors.

An additionally attractive feature of the adaptive controllers of this invention is an ability to compensate for dynamic cross-couplings that exist between the position and force control loops in the hybrid control architecture. Furthermore, the adaptive force and position controllers have "learning capabilities" to cope with unpredictable changes in the manipulator or environment parameters such as environment or robotic arm stiffness. This is due to the fact that the controller gains are adapted rapidly on the basis of the manipulator's Cartesian space performance. Low computational requirements make the control loops in accordance with the principles of this invention suitable for implementation in on-line hydrid control with high sampling rates.

In short, the present invention is more straightforward and appealing than any known conventional approach.

BRIEF DESCRIPTION OF THE DRAWINGS

FIG. 13 includes FIGS. 13a and 13b and represents an alternate embodiment of the invention.

DETAILED DESCRIPTION OF THE DRAWING

Figure 1:
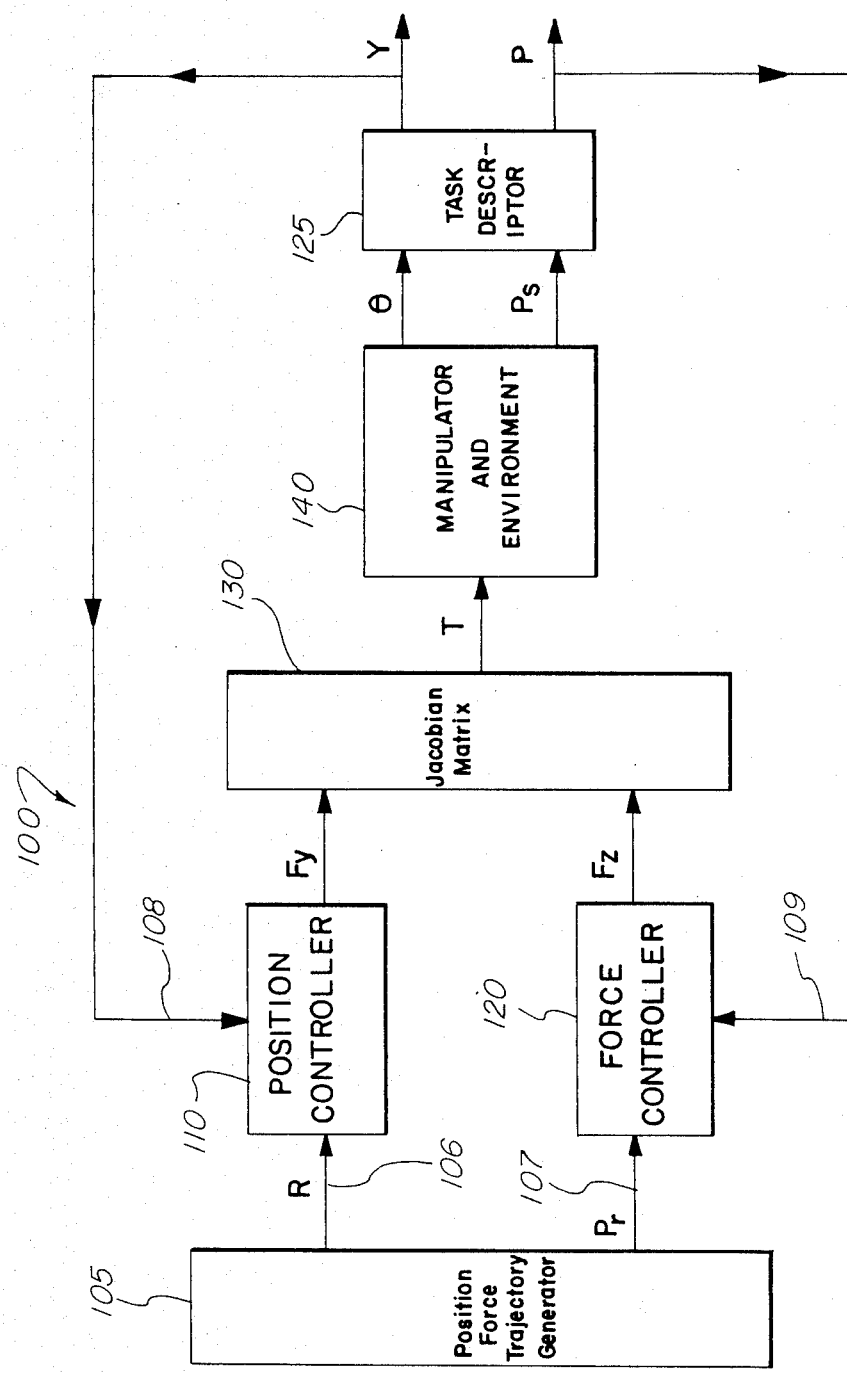
FIG. 1 depicts a block diagram of an improved hybrid control architecture in keeping with this invention.
Figure 6:
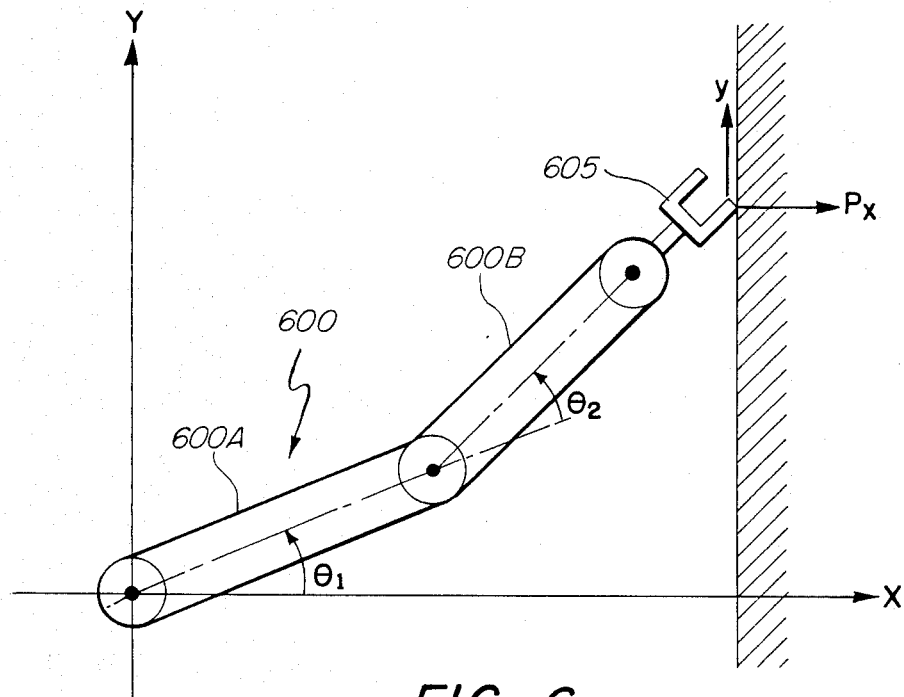
FIG. 6 is a two-link planar manipulator, end effector and reaction surface useful in understanding an illustrative example of the invention.

It is believed helpful to review the description of the drawings of FIG. 1 and FIG. 6 in conjunction with a review of the problem of controlling force and position of an end effector.

A robot manipulator such as manipulator 600, FIG. 6, performs a number of different tasks in a Cartesian space $\{X\}$. Each task, in general, involves motion of the manipulator including its end-effector 605, FIG. 6, in certain directions; and, simultaneously, exertion of force by the end-effector 605 on the environment 610, or an object in the environment 610, in the remaining directions. See, for example, M. T. Mason as noted earlier herein.

The directions of motion and the amount of force depend on the nature of the particular task to be performed and are reflected in the task descriptor 125 in the hybrid control system 100 shown in FIG. 1. The task descriptor 125 also contains the transformations required to map the measurements $\theta$ and $P_s$ of joint encoders and force/torque sensors into position and force variables in the constraint frame defined with respect to the task geometry. See, for example, Raibert and Craig as noted earlier herein. Note that the desired force and position trajectories are also specified in the constraint frame. As used herein, "position" implies position and orientation and "force" implies force and torque.

For any given task, the n-dimensional Cartesian space $\{X\}$ can be decomposed into two orthogonal l— and m-dimensional subspaces $\{Y\}$ and $\{Z\}$, where $n=1+m$. The "position subspace" $\{Y\}$ contains the l directions (i.e., degrees-of-freedom) in which the manipulator end-effector is free to move, and along which, the end-effector position is to be controlled. The "force subspace" $\{Z\}$ contains the remaining m directions in which the manipulator end-effector is constrained by, and interacts with, the environment and along which the contact force is to be controlled.

In the hybrid force/position control problem solved by this invention, we consider the "virtual" Cartesian force F acting on the end-effector as the manipulated variable and the position or force of the end-effector as the controlled variables. See, for example, O. Khatib and J. Burdick as noted earlier herein.

The hydrid control architecture is based on two controllers as shown in FIG. 1; namely, the position controller 110 which operates in {Y} and the force controller 120 which acts in {Z}. The position controller 110 generates the Cartesian end-effector force $F_y$ required to cause the end-effector motion to track a desired position trajectory in {Y}. The force controller 120 produces the Cartesian end-effector force $F_z$ needed to ensure that the end-effector force follows a desired force setpoint, or command, in {Z}. Since it is not possible to physically apply Cartesian forces directly to the end-effector, the equivalent joint torques needed to effectively cause these forces are computed and implemented. The required joint torques are obtained from the Cartesian forces by means of the Jacobian matrix, $J(\theta)$, 130 of 100, where $\theta$ is the joint angle vector.

In summary then, in FIG. 1, assume that it is desired to apply a constant force of a given amount simultaneous with desired movement of an end effector. The commands for this operation are issued on leads 106 and 107 from the position/force trajectory generator 105. The desired position or reference is signal R on lead 106 into position controller 110. The other output from generator 105, $P_r$, on lead 107 is the desired force signal. At the end effector, well-known devices measure the actual position Y and the actual force P, and signals Y and P are fed back over leads 108 and 109 to position and force controllers 110 and 120, respectively. The position controller 110 compares the desired position R and the actual position Y and derives an error, or control signal, $F_y$ which is output to the matrix 130. The force controller 120 does likewise for the desired and actual forces, $P_r$ and P, and an error or control signal $F_z$ is supplied to matrix 130.

The adaptive controllers of this invention may be thought of as generating the components which are applied directly to the end effector to move it in Cartesian space. Since it cannot be done directly, the matrix 130 transforms the control inputs $F_y$ and $F_z$ into signals which are applied to motors at joints of the robotic arm that will result in the desired position and force vectors. The transformaton by a Jacobian matrix is well known in this art and requires no further description. The output, T, from the maxtrix 130 to manipulator 140 results in joint position shown as $\theta$ into task descriptor 125. In a similar manner the force of the manipulator 140 results in a signal $P_s$ into task descriptor 125.

We shall now address the problems of force and position control separately in Sections 1 and 2 and then integrate the results in Section 3.

1. FORCE CONTROLLER

In this section, a simple dynamic model for a force controller in the subspace {Z} is described and adaptive force control in accordance with the invention is described.

1.1 Dynamic Force Model

Figure 2:
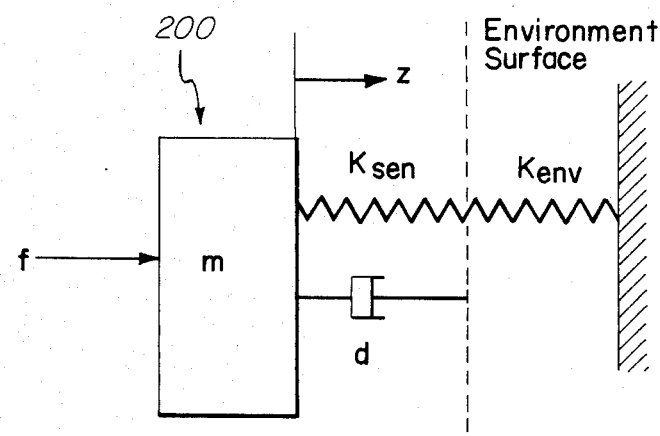
FIG. 2 is a simplified dynamic model of a robotic arm and environment which is useful in promoting a clearer understanding of certain aspects relevant to the invention.

The full dynamic model of an end-effector plus force/torque sensor in contact with the environment is complex. See, for example, Eppinger and Seering as noted earlier herein. However, the dynamic behavior of this system can be modeled approximately by a well known mass-spring-damper 200 in each degree-of-freedom as shown in FIG. 2 and described by the differential equation $$m\ddot{z}(t) + d\dot{z}(t) + kz(t) = f(t) \tag{1}$$

Generalizing this simple model to the m-dimensional force subspace {Z}, the dynamic behavior of the system in {Z} can be expressed by the differential equation $$M_o\ddot{Z}(t) + D_o\dot{Z}(t) + K_e Z(t) = F_z(t) \tag{2}$$

where Z(t) is the m×1 end-effector position/orientation vector, $M_o$ is the symmetric positive/definite m×m generalized mass matrix, $D_o$ is the m×m generalized damping matrix, $K_e$ is the diagonal m×m generalized stiffness matrix and $F_z$ is the m×1 force vector applied to the end-effector in the force subspace {Z}. The elements of $K_e$ are the "equivalent" translational (force) and rotational (torque) coefficients of elasticity (stiffness) of the system in various directions in {Z}. The equivalent stiffness $k_e$ of the force/torque sensor with stiffness $k_{sen}$ and the environment with stiffness $k_{env}$ is given by $$k_e = (k_{sen}^{-1} + k_{env}^{-1})^{-1}$$

By an appropriate choice of the {Z} subspace origin, the m×1 force/torque vector P(t) exerted by the end-effector on the environment is related to Z(t) by the generalization of Hooke's law as $$P(t) = K_e Z(t) \tag{3}$$

From equations (2) and (3), we obtain $$A\ddot{P}(t) + B\dot{P}(t) + P(t) = F_z(t) \tag{4}$$

where $A = M_o K_e^{-1}$ and $B = D_o K_e^{-1}$ are m×m matrices. Equation (4) gives a simple dynamic model of the system in the force subspace {Z}.

Since the manipulator dynamics are highly nonlinear, the matrices A and B in equation (4) are dependent on the end-effector Cartesian position and velocity vectors X and Ẋ and also on the system parameters such as the equivalent stiffness and the payload mass, which are represented by the parameter vector p. Furthermore, due to internal cross-coupling of the manipulator dynamics, a "disturbance" term $C_P(Y)$ nust be included in equation (4) to represent the dynamic coupling from the position loop into the force loop, where Y is the end-effector position vector in {Y}.

Taking the above into account, a more realistic model for force control is obtained as $$A(X,\dot{X},p)\ddot{P}(t) + B(X,\dot{X},p)\dot{P}(t) + P(t) + C_p(Y) = F_z(t) \tag{5}$$

Equation (5) is a set of highly complex nonlinear and coupled second-order differential equations.

1.2 Adaptive Force Control

In order to control the force/torque P(t) exerted by the end-effector on the environment, a PID controller is employed with adaptive gains $\{K_p(t), K_I(t), K_D(t)\}$ and an auxiliary signal d(t) in the force control law as developed herein. The force control law is $$F_z(t) = P_r(t) + K_p(t) E(t) + K_I(t) \int_0^t E(t)dt + K_D(t) \dot{E}(t) + d(t) \tag{6}$$

where $P_r(t)$ is the m×1 vector of desired force trajectory used as a feedforward term, and the m×1 force tracking-error vector $E(t) = P_r(t) - P(t)$ is the deviation of the actual (measured) force from the desired value. Since in practical applications the desired force trajectory is very often a constant setpoint $P_r(t) = P_r$, the PID control law is particularly suitable for this situation.

Furthermore, it should be appreciated that the auxiliary signal $d(t)$ compensates for the cross-coupling term $C_p$ and the time and parameter variations of A and B matrices. Note that the feedforward term $\ddot{P}_r(t)$ is included in the control law (6) since ideally we want $P(t) = P_r(t)$.

In equation (6), the gains of the PID controller, namely $K_p(t)$, $K_I(t)$ and $K_D(t)$, and also the auxiliary signal $d(t)$ are adapted in real-time to accomplish force setpoint tracking in spite of the nonlinear and possibley time-varying behavior of the system model of equation (5).

On applying the linear control law of equation (6) to the system model of equation (5), we obtain $$A \ddot{P}(t) + B \dot{P}(t) + C_p = \ddot{P}_r(t) + K_p E(t) + K_I \int_0^t E(t)dt + K_D \dot{E}(t) + d(t) \quad (7)$$

Using $E(t) = P_r(t) - P(t)$ and noting the $\dot{E}(t) = -\dot{P}(t)$ and $\ddot{E}(t) = -\ddot{P}(t)$ for a constant desired force, equation (7) can be written as $$\ddot{E}(t) + A^{-1}(B+K_D)\dot{E}(t) + A^{-1}(I+K_p)E(t) + A^{-1}K_I E^*(t) = A^{-1}[C_p - d(t)] \quad (8)$$

where $$E^*(t) = \int_0^t E(t)dt$$

is the $m+1$ integral error vector. Equation (8) can be expressed in standard state-space form as $$\frac{dx_e(t)}{dt} = \quad (9)$$

$$\begin{pmatrix} 0 & I_m & 0 \\ 0 & 0 & I_m \\ -A^{-1}K_I & -A^{-1}(I+K_p) & -A^{-1}(B+K_D) \end{pmatrix} x_e(t) +$$

$$\begin{pmatrix} 0 \\ 0 \\ A^{-1}(C_p - d) \end{pmatrix} \text{where } x_e(t) = \begin{pmatrix} E^*(t) \\ E(t) \\ \dot{E}(t) \end{pmatrix}$$

is the 3 m×1 augmented error vector. Equation (9) constitutes the "adjustable system" in the Model Reference Arm Control ("MRAC") framework.

Now, in the ideal situation, the desired behavior of the force error $E_m(t)$ is described by the homogeneous differential equation $$\ddot{E}_m(t) + D_3\dot{E}_m(t) + D_2 E_m(t) + D_1 E_m^*(t) = 0 \quad (10)$$

where $D_1$, $D_2$ and $D_3$ are constant m×m matrices which are chosen such that the equation (10) is stable and embodies the desired performance of the force control system. By choosing $D_1$, $D_2$ and $D_3$ as diagonal matrices, the force errors will be decoupled; for instance $$\ddot{E}_{mi}(t) + d_{3i}\dot{E}_{mi}(t) + d_{2i}E_{mi}(t) + d_{1i}E_{mi}^*(t) = 0 \quad (11)$$

where the coefficients $d_{1i}$, $d_{2i}$ and $d_{3i}$ are chosen such that the tracking-error $E_i(t) = P_{ri}(t) - P_i(t)$ has a desired behavior and $d_{2i}d_{3i} > d_{1i}$ to ensure stability.

Equation (10) can be written as $$\dot{x}_m(t) = \begin{pmatrix} 0 & I_m & 0 \\ 0 & 0 & I_m \\ -D_1 & -D_2 & -D_3 \end{pmatrix} x_m(t) = D x_m(t) \quad (12)$$

$$\text{where } x_m(t) = \begin{pmatrix} E^*_m(t) \\ E_m(t) \\ \dot{E}_m(t) \end{pmatrix}$$

is the 3 m×1 desired error vector. Equation (12) constitutes the "reference model" in the context of "MRAC" theory. Since the initial values of the actual and desired forces are often the same, the initial error $x_m(0)$ is equal to zero, and hence from equation (12), $x_m(t) = \exp[Dt].x_m(0) = 0$ for all t.

Now, in order for the adjustable system state $x_e(t)$ to tend to the reference model state $x_m(t) = 0$ asymptotically, from Gilbart, Monopoli, and Price, noted earlier, we require $$\begin{pmatrix} 0 \\ 0 \\ A^{-1}d \end{pmatrix} = Q_o^{-1} M x_e + Q^*_o M x_e \quad (13a)$$

$$\begin{pmatrix} 0 & 0 & 0 \\ 0 & 0 & 0 \\ A^{-1}K_I & A^{-1}K_p & A^{-1}K_D \end{pmatrix} = Q_1^{-1} M x_e x_e' \quad (13b)$$

$$\begin{pmatrix} \alpha_1 I_m & 0 & 0 \\ 0 & \beta_1 I_m & 0 \\ 0 & 0 & \gamma_1 L \end{pmatrix} + Q^*_1 M \frac{d}{dt}(x_e x_e') \begin{pmatrix} \alpha_2 I_m & 0 & 0 \\ 0 & \beta_2 I_m & 0 \\ 0 & 0 & \gamma_2 L \end{pmatrix}$$

where "'" denotes transposition, $\{\alpha_1, \beta_1, \gamma_1\}$ are positive scalars, $\{\alpha_2, \beta_2, \gamma_2\}$ are zero or positive scalars, and L is an m×m constant matrix to be specified later. In equation (13), $Q_o$ and $Q_I$ are symmetric positive-definite 3 m×3 m matrices, $Q_o^*$ and $Q_1^*$ are symmetric positive semi-definite 3 m×3 m matrices, and the symmmetric positive-definite 3 m×3 m matrix $$M = \begin{pmatrix} M_1 & M_2 & M_3 \\ M_2 & M_4 & M_5 \\ M_3 & M_5 & M_6 \end{pmatrix}$$

is the solution of the Lyapunov equation for the reference model (12), namely $$MD + D'M = -N \quad (14)$$

where N is a symmetric positive-definite 3 m×3 m matrix. In deriving equation (13), the matrices A, B, and Cp in the robot model of equation (5) are assumed to be unknown and "slowly time-varying" compared with the adaptation algorithm. This assumption is proper since these matrices cannot change significantly in each sampling interval, which interval is of the order of a millisecond. Now, in order to make the controller adaptation laws independent of the model matrix A, we choose $$Q_o = \frac{1}{\delta_1} A^*; \; Q_1 = A^*; \; Q^*_o = \delta_2 [A^*]^{-1}; \quad (15)$$

$$Q^*_1 = [A^*]^{-1}$$

where $\{\delta_1, \delta_2\}$ are positive and zero or positive scalars, and $$A^* = \begin{pmatrix} A & 0 & 0 \\ 0 & A & 0 \\ 0 & 0 & A \end{pmatrix}$$

is a symmetric positive-definite 3 m×3 m matrix. Also note that A is a symmetric positive-definite matrix and hence A* and $[A^*]^{-1}$ are also symmetric positivie-definite matrices.

Substituting from equation (15) into equation (13), after simplification we obtain the adaptation laws $$\dot{d}(t) = \delta_1 q(t) + \delta_2 \dot{q}(t) \quad (16)$$

$$\dot{K}_I(t) = \alpha_1 [q(t) E^*(t)] + \alpha_2 \frac{d}{dt}[q(t) E^*(t)] \quad (17)$$

$$\dot{K}_p(t) = \beta_1 [q(t) E'(t)] + \beta_2 \frac{d}{dt}[q(t) E'(t)] \quad (18)$$

$$\dot{K}_D(t) = \gamma_1 [q(t) E'(t)L] + \gamma_2 \frac{d}{dt}[q(t) E'(t)L] \quad (19)$$

where q(t) is the m×1 "weighted" force error vector defined as $$q(t) = M_3 E^*(t) + M_5 E(t) + M_6 \dot{E}(t) \quad (20)$$

and $M_3$, $M_5$ and $M_6$ are appropriate submatrices of M. Thus, the required auxiliary signal and PID controller gains are obtained as $$d(t) = d(0) + \delta_1 \int_0^t q(t)dt + \delta_2 q(t) \quad (21)$$

$$K_I(t) = K_I(0) + \alpha_1 \int_0^t q(t) E^*(t)dt + \alpha_2 q(t) E^*(t) \quad (22)$$

$$K_p(t) = K_p(0) + \beta_1 \int_0^t q(t) E'(t)dt + \beta_2 q(t) E'(t) \quad (23)$$

$$K_D(t) = K_D(0) + \gamma_1 \int_0^t q(t) E'(t)Ldt + \gamma_2 q(t) E'(t)L \quad (24)$$

The force control law is then given by $$F_z(t) = P_r(t) + d(t) + K_I(t) \int_0^t E(t)dt + K_p(t)E(t) + K_D(t)\dot{E}(t) \quad (25)$$

It is noted that the auxiliary signal d(t) can be generated by a PI²D controller driven by the force error E(t) since, from equations (20)-(21), d(t) can be expressed as $$d(t) = d(0) + [\delta_2 M_6]\dot{E}(t) + [\delta_1 + \delta_2 M_5]E(t) + [\delta_1 M_5 + \delta_2 M_3]\int_0^t E(t)dt + [\delta_1 M_3]\int_0^t \left(\int_0^t E(t)dt\right)dt$$

Figure 3:
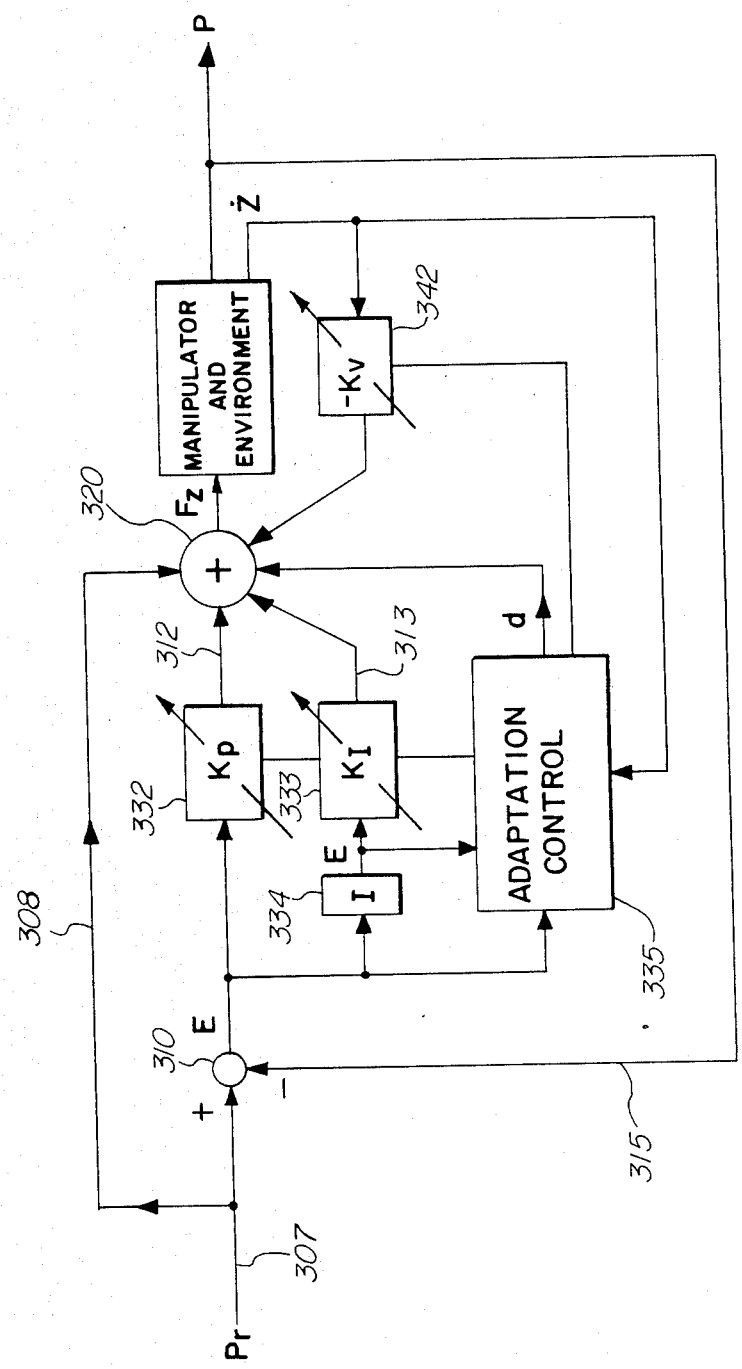
FIG. 3 is a simplified block diagram of a controller for performing adaptive force control in accordance with the invention.

In practical implementation of any force control law, differentiation of the noisy force measurement P(t) is undesirable and, moreover, differentiation of the constant force setpoint $P_r$ produces unwanted impulses. This argument suggests that the derivative $\dot{E}(t)$ in equations (20), (24) and (25) must be replaced by $-K_e \dot{Z}(t)$ using equation (3). This yields the linear adaptive force control law $$F_z(t) = P_r(t) + d(t) + K_I(t) \int_0^t E(t)dt + \quad (26)$$

$$K_p(t)E(t) - K_v(t)\dot{Z}(t)$$

which is shown in FIG. 3, where $K_v(t) = K_D(t)K_e$ is the m×m velocity feedback gain matrix and the term $K_v(t)\dot{Z}(t)$ represents velocity damping.

FIG. 3 is the control loop for performing adaptive force control in accordance with the invention. FIG. 3 is an adaptive controller capable of performing the control law of equation 26. In FIG. 3 the reference signal $P_r$ applied at lead 307 is fed forward via loop 308 to a summing junction 320. The output from summing junction 320 is the signal $F_z$ which is an electrical signal that represents the force control law of equation 26.

Summing junction 310 receives the reference signal $P_r$ and combines it with the actual force signal P that is fed back after measurement by a force sensor at the end effector, via feedback loop 315. An error signal E from summing junction 310 is applied to two separate variable gain circuits 332 and 333.

Gain circuit 332 connected in lead 312 between summing junctions 310 and 320 represents the term $K_p$. Input signal E is applied to the variable $K_p$ gain circuit 332 which varies in time as controlled by adaptation control 335.

Adaptation control 335 also controls a second variable gain circuit 333 which is connected in lead 313 between 310 and 320. An integration circuit 334 receives the error signal E, integrates it, and delivers an integral of the error, signal E*, to gain circuit 333. The output from the variable gain circuit 333 is an input term to summing junction 320.

Adaptation control 335 receives three input terms, namely error E, integral E* and $\dot{Z}$. The term $\dot{Z}$ is a measured velocity term which indicates how fast the end effector is moving into the manipulated object as the force is being applied. $\dot{Z}$ is also fed through another variable gain circuit 342 and the modified $\dot{Z}$ term is also fed into summing junction 320. Note that this position-related term is in the adaptive force controller and it assists in the cross-coupling stability feature of this invention.

Choosing $L = (K_e^{-1})^2$ and replacing for L in equation (19), the adaptation laws now become $$d(t) = d(0) + \delta_1 \int_0^t q(t)dt + \delta_2 q(t) \tag{27}$$

$$K_I(t) = K_I(0) + \alpha_1 \int_0^t q(t)E^*(t)dt + \alpha_2 q(t)E^*(t) \tag{28}$$

$$K_p(t) = K_p(0) + \beta_1 \int_0^t q(t)E'(t)dt + \beta_2 q(t)E'(t) \tag{29}$$

$$K_v(t) = K_v(0) + \gamma_1 \int_0^t q(t)\dot{Z}'(t)dt - \gamma_2 q(t)\dot{Z}'(t) \tag{30}$$

where $$q(t) = M_3 E^*(t) + M_5 E(t) - M_6^* \dot{Z}(t) \tag{31}$$

and $M_6^* = M_6 K_e$. By proper selection of matrix N in the Lyapunov equation (14), the submatrices $M_3$, $M_5$ and $M_6$ in equation (20) can be made equal to the desired values $W_I$, $W_p$ and $W_D = W_v K_e^{-1}$ respectively, and hence equation (31) becomes $$q(t) = W_I E^*(t) + W_p E(t) - W_v \dot{Z}(t) \tag{32}$$

where $W_I$, and $W_p$ and $W_v$ are the m×m diagonal weighting matrices chosen to reflect the relative significance of the integral error $E^*$, the force error E, and the velocity $\dot{Z}$, respectively.

Adaptation control 335 synthesizes a signal d which is also applied to summing junction 320. Equations (27) through (30) are performed by the adaptation control 335. Adaptation control 335 may be any suitable device such as a program in a memory which, upon input of terms E, $E^*$, and $\dot{Z}$ converts them into the equations (27) through (30). Note that each of these equations vary with time and, when applied to the variable gain circuits, also vary the gain in time.

From equations (27)–(30), the general expression for a typical controller gain K(t) which acts on the signal v(t) to generate the term K(t)v(t) in the control law (26) can be written as $$K(t) = K(0) + \mu_1 \int_0^t q(t)v'(t)dt + \mu_2 q(t)v'(t) \tag{33}$$

where $\mu_1$ and $\mu_2$ are scalar gains.

The adaptive force control of this invention is extremely simple, since the adaptation laws (27) through (30) generate the controller gains by means of simple integration using, for instance, the trapezoidal rule; e.g. equation (33) can be implemented as $$K(i) = K(i-1) + \mu_1 \cdot \frac{T_s}{2} [q(i)v'(i) + q(i-1)v'(i-1)] + \mu_2 q(i)v'(i) \tag{34}$$

where the integer i denotes the sampling instant and $T_s$ is the sampling period. As a result, the force control law of equation (26) can be evaluated very rapidly and consequently, force control is implemented for real-time control with high sampling rates (typically 1 KHz).

While a sampling source is not shown in FIG. 3, it is to be understood that all components are sampled and synchronized for a real-time adaptive control. The high sampling rate of real-time adaptive control is very desirable and yields improved dynamic performance. The adaptation laws (27) through (30) do not require the complex nonlinear model of manipulator dynamics (5) or any knowledge of parameters of the manipulator or the environment. This is due to the fact that the adaptive force controller has "learning capabilities" and can rapidly adapt itself to gross changes in the manipulator or the environment parameters.

2. POSITION CONTROLLER

In this section, a dynamic model for adaptive position control in the subspace {Y} is described.

2.1 Dynamic Position Model

The dynamics of the end-effector in the Cartesian space {X} can be represented as discussed in O. Khatib as noted earlier herein. The dynamics are represented as $$\Lambda(X)\ddot{X} + \phi(X, \dot{X}) + \psi(x) + P = F \tag{35}$$

where $\Lambda$ is the Cartesian mass matrix, $\phi$ is the Cartesian centrifugal, Coriolis and friction vector $\psi$ is the Cartesian gravity loading vector, P is the force vector exerted by the end-effector on the environment, and F is the generalized "virtual" Cartesian force vector applied to the end-effector. In the position subspace {Y}, equation (35) can be written as $$\bar{A}(X, \dot{X}, p)\ddot{Y}(t) + \bar{B}(X, \dot{X}, p)\dot{Y}(t) + \bar{C}_o(X, \dot{X}, p)Y(t) + C_f(P) = F_y(t) \tag{36}$$

where the 1×1 matrices $\bar{A}$, $\bar{G}$, $\bar{C}_o$ are highly complex nonlinear functions of X, $\dot{X}$ and the system parameters p, $C_f$ represents the dynamic coupling effect from the force loop into the position loop which is a function of the force vector P in {Z}, and $F_y$ is the 1×1 force vector applied to the end-effector in the position subspace {Y}. Equation (36) is a set of highly complex nonlinear and coupled second-order differential equations.

2.2 Adaptive Position Control

The linear adaptive position control law in accordance with this invention is given by $$F_y(t) = f(t) + \bar{K}_p(t)E_p(t) + \bar{K}_v(t)\dot{E}_p(t) + \bar{C}(t)R(t) + \bar{B}(t)\dot{R}(t) + \bar{A}(t)\ddot{R}(t) \tag{37}$$

where R(t) is the 1×1 reference (desired) position trajectory vector, $E_p(t) = R(t) - Y(t)$ is the 1×1 position tracking-error vector, f(t) is an auxiliary signal, and $[\bar{K}_p E_p + \bar{K}_v \dot{E}_p]$ and $[\bar{C}R + \bar{B}\dot{R} + \bar{A}\ddot{R}]$ are the contributions due to the feedback and feedforward controllers respectively. The required auxiliary signal and controller gains are adapted according to the following laws:

$$f(t) = f(0) + \delta_1 \int_0^t r(t)dt + \delta_2 r(t) \tag{38}$$

$$K_p(t) = K_p(0) + \nu_1 \int_0^t r(t)E_p'(t)dt + \nu_2 r(t) E_p'(t) \tag{39}$$

$$K_v(t) = K_v(0) + \eta_1 \int_0^t r(t)E_p'(t)dt + \eta_2 r(t)E_p'(t) \tag{40}$$

$$C(t) = C(0) + \mu_1 \int_0^t r(t)R'(t)dt + \mu_2 r(t)R'(t) \tag{41}$$

-continued $$B(t) = B(0) + \gamma_1 \int_0^t r(t)R'(t)dt + \gamma_2 r(t)R'(t) \quad (42)$$

$$A(t) = A(0) + \lambda_1 \int_0^t r(t)R'(t)dt + \lambda_2 q(t)R'(t) \quad (43)$$

where the 1×1 "weighted" position error vector r(t) is defined as $$r(t) = W_p E_p(t) + W_v E_p(t) \quad (44)$$

in equations (38)–(43), $\{\bar{\delta}_1, \bar{\nu}_1, \bar{\eta}_1, \bar{\mu}_1, \bar{\gamma}_1, \bar{\lambda}_1\}$ are positive scalars, $\{\bar{\delta}_2, \bar{\nu}_2, \bar{\eta}_2, \bar{\mu}_2, \bar{\gamma}_2, \bar{\lambda}_2\}$ are positive or zero scalars, and WPhd p and $W_v$ are weighting matrices reflecting the relative significance of the position and velocity errors $E_p$ and $\dot{E}_p$.

The position control scheme is extremely simple since the controller gains are obtained from equations (38) through (43) by simple integration (such as the trapezoidal rule) and thus the computational time required to evaluate the position control law (37) is extremely short. Thus, the adaptive position control of this invention is implemented for on-line control with high sampling rates (~1 KHz); resulting in improved dynamic performance.

3. HYBRID FORCE/POSITION CONTROL SYSTEM

In Sections 1 and 2, the Cartesian end-effector forces $F_z$ and $F_y$ are generated by the force and position controllers to accomplish force and position tracking in {Z} and {Y} respectively. Since Cartesian forces cannot be applied to the end-effector in practice, these end-effector forces must be mapped into the equivalent joint torques. Thus, in order to implement the force and position controllers, the control law in joint space is given by J. J. Craig (37 Robotics-Mechanics and Control," Addison-Wesley Publishing Company, Reading, MA, 1986).

$$T(t) = J'(\theta) \begin{pmatrix} F_z(t) \\ F_y(t) \end{pmatrix} \quad (45)$$

where is the n×1 joint angle vector, T is the n×1 joint torque vector, and J is the n×n Jacobian matrix of the manipulator, with appropriate reordering of the columns of J if necessary.

Figure 4:
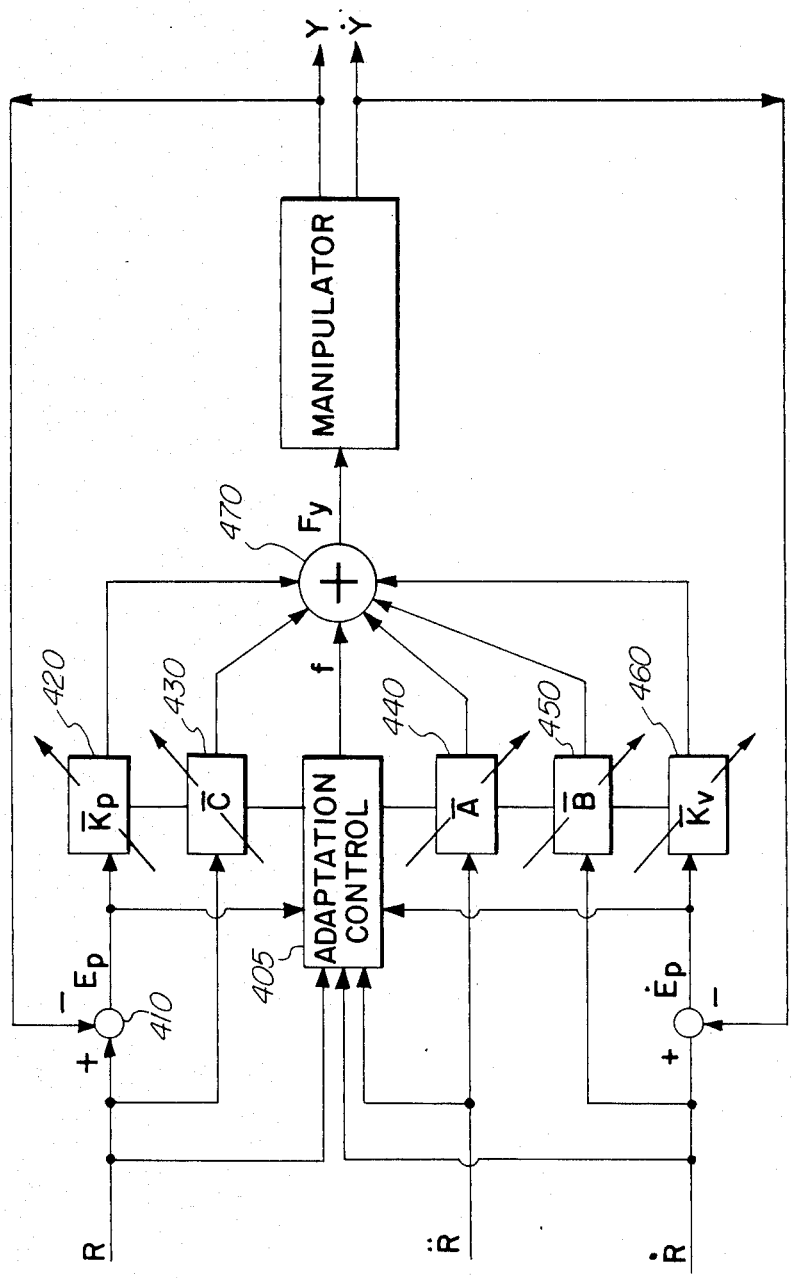
FIG. 4 is a simplified block diagram of a controller for performing adaptive position control in accordance with the invention.

In FIG. 4 the desired position, R, is a signal from the trajectory generator 105, FIG. 1. That signal R is a measured value at the end effector, and it is applied to a summing junction 410 where it is compared with the actual position Y. The other two input terms R and R are also specified by the trajectory generator and represent desired velocity and desired acceleration. These input terms thus fully determine what kind of movement at what speed and how quickly the end effector is to be controlled.

In a manner very similar to that described earlier for FIG. 3, the adaptation control 405 performs the position control equations (36) through (44) by controlling the gain of the various variable gain amplifiers as shown in FIG. 4 for the appropriately labeled portions of the position control law of equation (37). Thus, position adaptation control 405 controls the variable gain units 420, 430, 440, 450, 460 to input respectively to summing junction 470, position feedback gain, position feedforward gain, accelaration feedforward gain, velocity feedforward gain and velocity feedback gain. Note that Y is not a directly measured term but, in a manner for Z, is an indirectly derived term computed from the joint encoders in any well-known manner. Adaptation control 405 also supplies the auxiliary signal f which is a synthesized position control term as shown in position control law (37).

It is important to note that although the force and position controllers are separate in the hybrid control architecture, there exists dynamic cross-coupling from the force control loop into the position control loop and vice versa. This coupling is due to the fact that the end-effector dynamics in the Cartesian space {X} is strongly cross-coupled; i.e. the application of end-effector force in any direction affects the end-effector positions in all directions. The cross-coupling effects are modeled as "disturbance" terms $C_p$ and $C_f$ in the force and position control laws and related control loops.

The adaptive controllers of this invention compensate for these disturbances and maintain a good tracking performance. The ability to cope with cross-coupling effects in the hybrid control architecture of this invention is an important feature.

Figure 5:
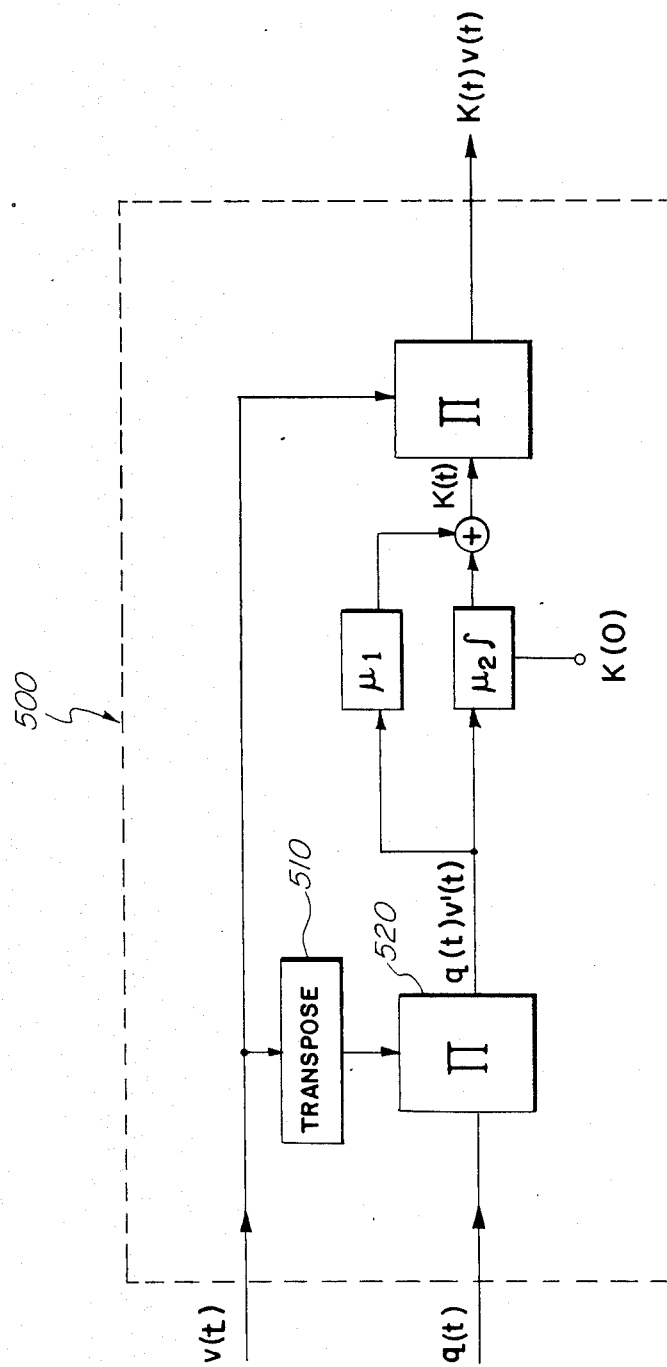
FIG. 5 is a block diagram of a basic module which is repeated as necessary for implementation of the controller functions of adaptive force and position control in accordance with this invention.

FIG. 5 is a generic module which is readily adaptible for achieving the adaptive gain terms for the force/position control laws of this invention. In FIG. 5, the input term v(t) can be any of the variables shown in the control law equations (26) or (37). Note, for this example, that the last term of force control equation 26 is the output term from module 500. The input term q(t) was defined earlier herein at equatiions (31), (32), etc. Input term v(t) is transformed or reorganized by transformation unit 510 and is applied to a multiplier unit 520. The remainder of the module is self explanatory and needs no further explanation. Suffice it to say that each module 500 for the specific terms of the adaptive force/position control laws is used in the variable gain units such as the five units 420, 430, 440, 450, and 460, FIG. 4. In addition another module unit in adaptation control 405 generates the auxiliary term f. The same holds true for the adaptive force control functions as depicted and described by FIG. 3. Since the modules are operating in parallel, high speed solutions to the simple arithmetic operations of this invention are readily achieved.

4. ILLUSTRATIVE EXAMPLE

The adaptive force/position control of this invention is applied to a two-link planar manipulator to control the motion and the exerted force of the end-effector simultaneously. The results of that application is now described.

Consider the two-link manipulator depicted in a vertical plane in FIG. 6. It is assumed the manipulator's end-effector 605 is contacting a vertical reaction surface 610. The dynamic model which relates the joint torque vector $$T = \begin{pmatrix} T_1 \\ T_2 \end{pmatrix}$$

to the joint angle vector $$\theta = \begin{pmatrix} \theta_1 \\ \theta_2 \end{pmatrix}$$

is well known. Such a model, described by J. J. Craig, as noted erlier noted, is given as:

$$T(t) = M(\theta)\ddot{\theta} + N(\theta, \dot{\theta}) + G(\theta) + J^T(\theta)P(t) \qquad (46)$$

where the above terms are defined as:
Inertia matrix $$M(\theta) = \begin{pmatrix} a_1 + a_2\cos\theta_2 & a_3 + (a_2/2)\cos\theta_2 \\ a_3 + (a_2/2)\cos\theta_2 & a_3 \end{pmatrix}$$

Coriolis and centrifugal torque vector $$N(\theta, \dot{\theta}) = \begin{pmatrix} -(a_2\sin\theta_2)(\dot\theta_1\dot\theta_2 + \dot\theta_2^2/2) \\ (a_2\sin\theta_2)\dot\theta_1^2/2 \end{pmatrix}$$

Gravity loading vector $$G(\theta) = \begin{pmatrix} a_4\cos\theta_1 + a_5\cos(\theta_1 + \theta_2) \\ a_5\cos(\theta_1 + \theta_2) \end{pmatrix}$$

Jacobian matrix $$J(\theta) = \begin{pmatrix} -l_1\sin\theta_1 - l_2\sin(\theta_1 + \theta_2) & -l_2\sin(\theta_1 + \theta_2) \\ l_1\cos\theta_1 + l_2\cos(\theta_1 + \theta_2) & l_2\cos(\theta_1 + \theta_2) \end{pmatrix}$$

End-effector force vector $$P(t) = \begin{pmatrix} P_x(t) \\ 0 \end{pmatrix}; \quad P_x(t) = \begin{cases} 0 & \text{if } x < x_o \text{ (no contact)} \\ K_e[x(t) - x_o] & \text{if } x \geq x_o \\ & \text{(during contact)} \end{cases}$$

where $K_e$ is the stiffness of the reaction surface, $X_o$ is the location of the surface, and $$x(t) = l_1 \cos\theta_1 + l_2 \cos(\theta_1 + \theta_2)$$

is the horizontal coordinate of the end-effector in the base frame generated by the task descriptor 125, FIG. 1. The task descriptor 125 also generates the end-effector vertical coordinate y(t) from the joint angles $\theta_1$ and $\theta_2$ as $$y(t) = l_1 \sin\theta_1 + l_2 \sin(\theta_1 + \theta_2)$$

In the above expressions, $a_1, \ldots, a_5$ are constant parameters obtained from the masses $\{m_1, m_2\}$ and the lengths $\{l_1, l_2\}$ of the robot links 600A and 600B, including the end-effector 605. For the particular robot under study, the numerical values of the link parameters are chosen as $$M_1 = 15.91 \text{ kg}, \quad m_2 = 11.36 \text{ kg}, \quad l_1 = l_2 = 0.432 \text{ meter}$$

so that they represent links 2 and 3 of the commercially available Unimation PUMA 560 arm. The reaction surface location is $x_o = 0.432$ meter and its stiffness is chosen as $K_3 = 10^4$ Nt/meter. It should be understood that the mathematical model and the parameter values of the robot and the reaction surface are used merely to simulate the robot behavior and are not used to generate the control action; i.e. the system dynamics in accordance with this invention is treated as a "black-box" by the adaptive force and position controllers 120, 110, FIG. 1.

Suppose that the end-effector is required to apply a specified constant force setpoint $P_r$ on the reaction surface in the x-direction and simultaneously track a given position trajectory $y_d(t)$ in the y-direction; where $$P_r(t) = 10 \text{ Newton}$$

$$y_r(t) = 0.432[1 \times 6 \exp(-t/0.3) - 8 \exp(-t/0.4)] \text{ meter}$$

with $y_r(0) = -0.432$, $y_r(\infty) = 0.432$ and $\dot{y}_r(0) = \dot{y}_r(\infty) = 0$.

Using the adaptive hybrid control system of this invention, the two-dimensional Cartesian space $\{X\}$ is decomposed into two orthogonal one-dimensional force subspace $\{x\}$ and position subspace $\{y\}$. For each subspace, a separate adaptive controller designed in accordance with this invention is as follows. In this example, the base frame 630 is chosen as the constraint frame.

Force Controller: In accordance with Section 1, a reference model for the force tracking-error $e_x(t) = P_r(t) - P_x(t)$ is chosen as $$\dddot{e}_x(t) + 30\ddot{e}_x(t) + 300\dot{e}_x(t) + 1000e_x^*(t) = 0$$

with three characteristic roots at $-10$; yielding $D_1 = 1000$, $D_2 = 300$, and $D_3 = 30$. The linear adaptive force control law is given by $$F_x(t) = P_r(t) + d(t) + K_I(t)\int_0^t e_x(t)dt + K_p(t)e_x(t) - \qquad (47)$$

$$K_v(t)\dot{x}(t)$$

where $F_x$ is the control force applied to the end-effector in the x-direction. The adaptive force controller gains are adapted as follows:

$$d(t) = q(t) + \int_0^t q(t)dt$$

$$K_I(t) = 1000 + 100 \int_0^t q(t) e_x^*(t)dt$$

$$K_p(t) = 100 + 10 \int_0^t q(t) e_x(t)dt$$

$$K_v(t) = (5) 10^3 - (4) 10^4 \int_0^t q(t) \dot{x}(t)dt$$

where $$q(t) = 2e_x^*(t) + 0.25e_x(t) - 100x(t)$$

and $$e_x^*(t) = \int_0^t e_x(t)dt$$

The integrals in the above equations are computed using the trapezoidal integration rule with dt = 0.5 msec.

Position Controller: In accordance with Section 2, a reference model for the position tracking-error $e_y = y_r(t) - y(t)$ is chosen as $$\ddot{e}_y(t) + 20\dot{e}_y(t) + 100e_y(t) = 0$$

with natural frequency $\omega = 10$ rad/sec and damping factor $\xi = 1$; yielding $D_1 = 100$ and $D_2 = 20$. The linear adaptive position control law is given by $$F_y(t) = f(t) + \overline{K}_p(t)e_y(t) + \overline{K}_v(t)\dot{e}_y(t) + \overline{C}(t)y_r(t) + \overline{B}(t) + \overline{A}(t)\ddot{y}_r(t) \quad (48)$$

where $F_y$ is the control force applied to the end-effector in the y-direction. The adaptive position controller gains are adapted as follows:

$$f(t) = 0.5r(t) + 0.5 \int_0^t r(t)dt$$

$$K_p(t) = 2 \int_0^t r(t) e_y(t) dt$$

$$K_v(t) = 2 \int_0^t r(t) \dot{e}_y(t) dt$$

$$C(t) = 0.5 \int_0^t r(t) y_r(t) dt$$

$$B(t) = 0.5 \int_0^t r(t) \dot{y}_r(t) dt$$

$$A(t) = 0.5 \int_0^t r(t) \ddot{y}_r(t) dt$$

$$r(t) = 500 \, e_y(t) + 200 \, \dot{e}_y(t)$$

The integrals in the adaptation laws are evaluated using the trapezoidal rule with $dt = 0.5$ msec.

Figure 7:
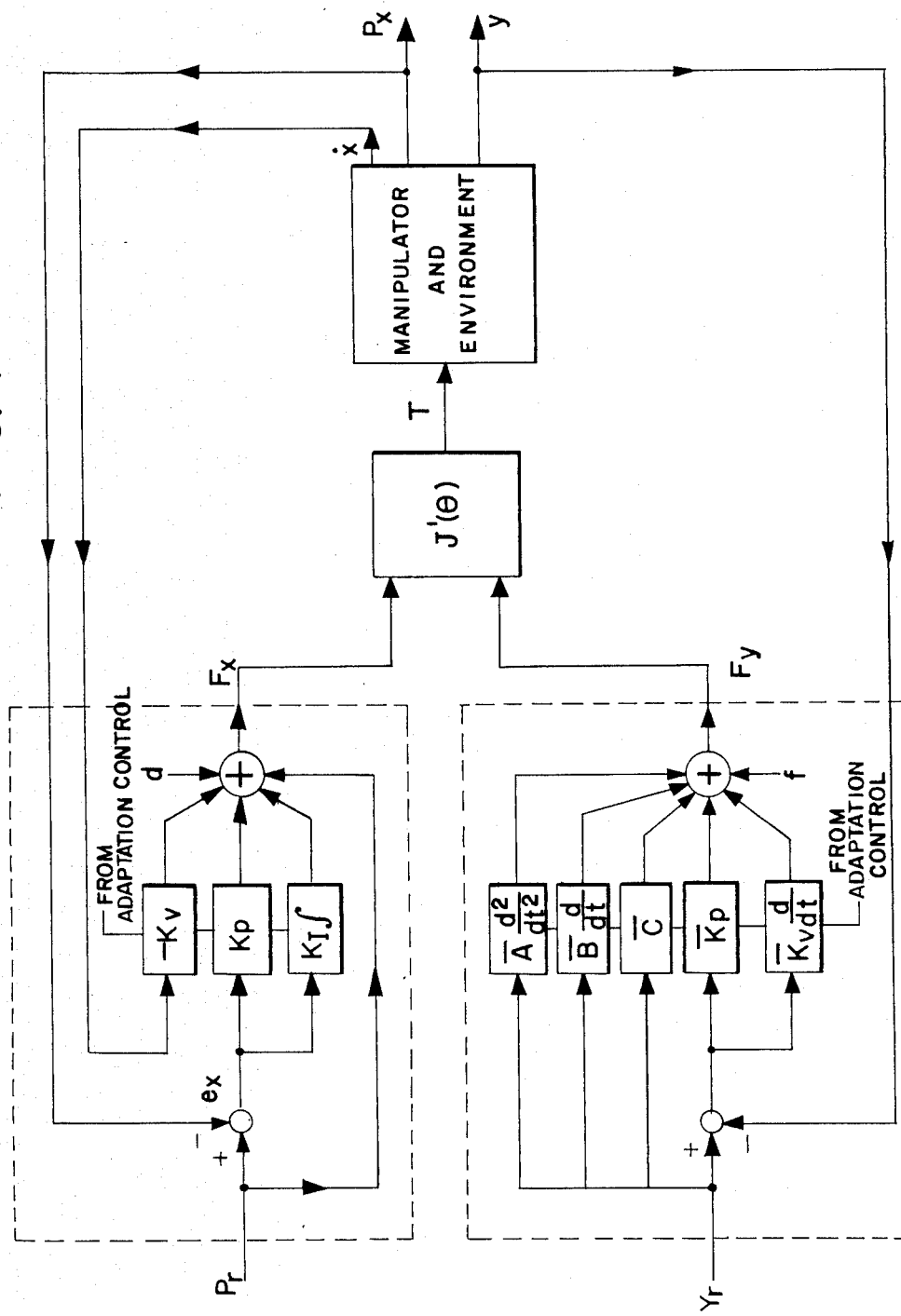
FIG. 7 is an embodiment of the invention which included simulation by a computer operation.

Hybrid Control: The force and position controllers described above operate in the adaptive hybrid control system of FIG. 7. The joint control law is then given by $$T(t) = J'(\theta) \begin{pmatrix} F_x(t) \\ F_y(t) \end{pmatrix} \quad (49)$$

Figure 8A:
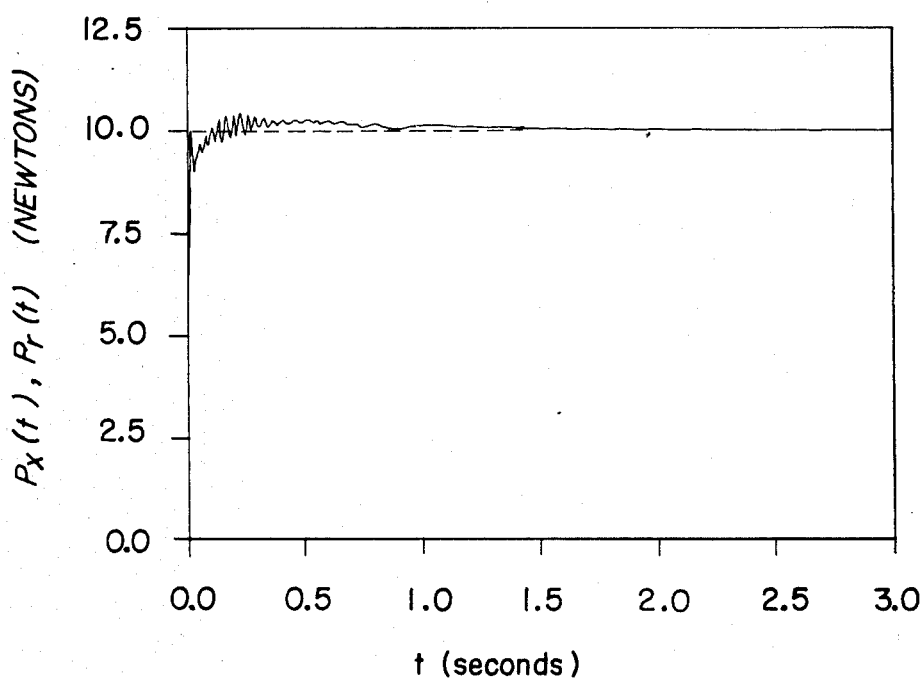
FIG. 8 includes FIGS. 8a and 8b which respectively reflect an evaluation of the invention for responses to contact force and position under adaptive control.
Figure 8B:
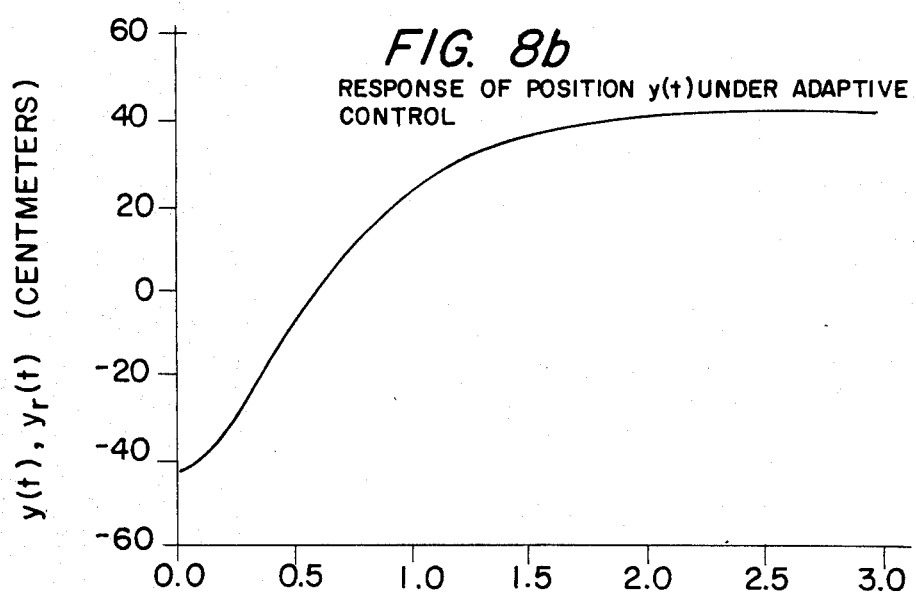

To evaluate the performance of the adaptive force-/position control schemes, the nonlinear dynamic model of the manipulator (46) and the adaptive hybrid control law (49) were simulated on a DEC-VAX 11/750 computer with the sampling period of 0.5 msec. The results of this simulation are shown in FIGS. 8a and 8b and indicate that $P_x(t)$ and $y(t)$ track the desired trajectories $P_r(t)$ and $y_r(t)$ very closely. Thus the adaptive force and position controllers of this invention compensate for system non-linearities in a highly satisfactory manner.

The performance of the adaptive controller system in four different cases was tested by the above-noted simulation and the results of these four cases are discussed as follows.

Case 1—Performance With No Vertical Motion

Figure 9A:
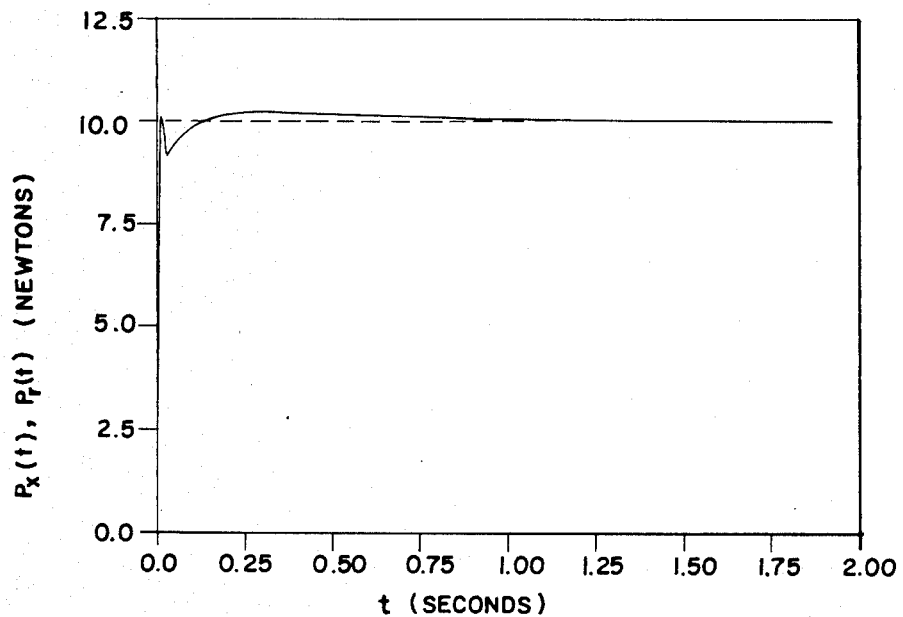
FIG. 9 includes FIGS. 9a and 9b and represents an evaluation of the performance of the controller of the invention.
Figure 9B:
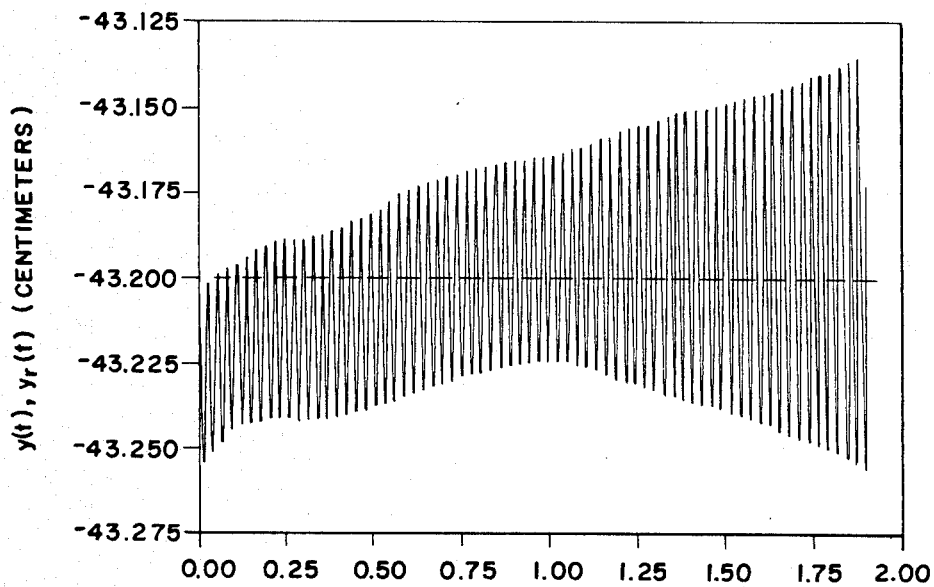

In this case, the end-effector is required not to move in the y-direction (i.e. $y_r(t) = -0.432$ meter) and exert the constant force of $P_r(t) = 10$ Nt on the reaction surface using the same control law (49). FIGS. 9a and 9b show the responses of the exerted force $P_x(t)$ and the vertical coordinate $y(t)$ and indicate that force tracking is accomplished and the maximum deviation of y from its initial (desired) value is less than 1 mm. The effect of cross-coupling between force and position control loops can be observed by comparing FIGS. 8a and 9a.

Case 2—Performance under Stiffness Variation

Figure 10:
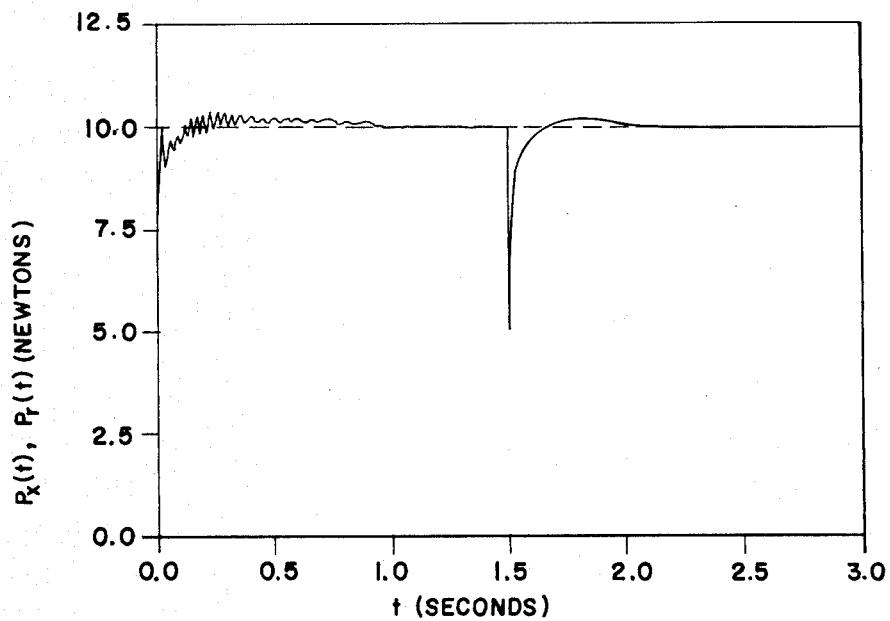
FIG. 10 includes FIGS. 10a and 10b and represent curves useful in demonstrating the invention's performance under stiffness variation.

In order to test the learning capability of the force controller, the stiffness of the reaction surface is suddenly changed to $K_e = (5)10^3$ Nt/meter at $t = 1.5$ seconds while the end-effector is exerting the force of 10 Nt on the surface under the adaptive control law (47). This abrupt change is a clear violation of the assumption made in the theory that the system parameters are "slowly time-varying." In spite of this violation, the adaptive force controller invention continues to perform remarkably well. FIG. 10 shows the response of the exerted force $P_x(t)$ and indicates that the desired force setpoint $P_r(t) = 10$ Nt is tracked closely despite the sudden change in $K_e$. Thus, the adaptive force controller is not unduly sensitive to reaction surface stiffness.

Case 3—Performance With Reaction Surface Movement

Figure 11A:
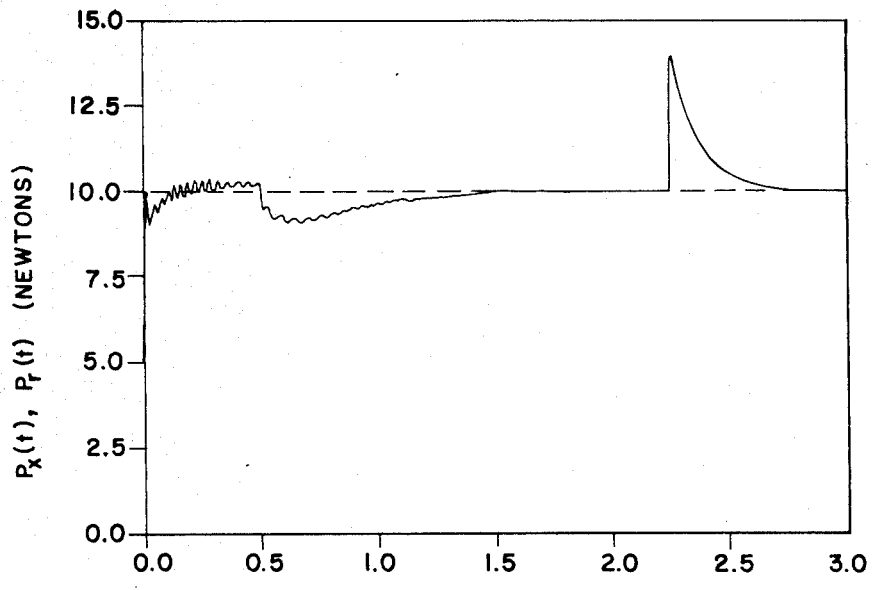
FIG. 11 includes FIGS. 11a and 11b which represent curves useful in demonstrating the invention's performance when subjected to movement of a reaction surface away from an end effector.

In this case, the end-effector is required to maintain the constant force of 10 Nt on the reaction surface while the surface is moved away from the end-effector in the positive x-direction with the constant speed of of 1 cm/sec in the time interval $0.5 < t < 2.25$ seconds. The response of the exerted force $P_x(t)$ and the position of the reaction surface $x_o(t)$ are shown in FIGS. 11a and 11b. It is seen that the constant force of 10 Nt is exerted on the surface despite the surface movement. The negative transient in $P_x(t)$ at $t = 0.5$ and the positive transient at $t = 2.25$ will be reasoned by those skilled in this art simply from the physics of the situation.

Case 4—Complaint Motion

In previous cases, it is assumed that the end-effector is the active element in force exertion. Let us now consider the reverse situation where the end-effector is the passive element and force is exerted by the reaction surface on the end-effector. In this case, suppose that the surface is moved towards the end-effector in the negative x-direction with the constant speed of 1 cm/sec in the time interval $0.5 < t < 2.5$ seconds, and the end-effector is required to comply with the surface movement while maintaining a small contact force of $P_r(t) = 0.1$ Nt. The end-effector will now reposition itself under the force control law (47) to maintain the desired force of 0.1 Nt; otherwise the contact force created will reach 200 Nt.

Figure 12A:
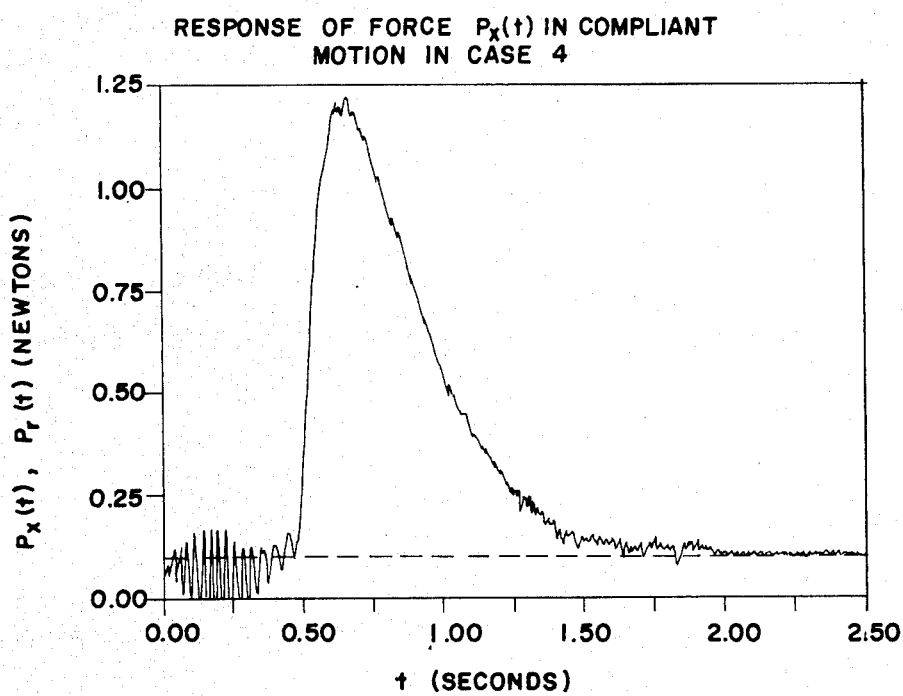
FIG. 12 includes FIGS. 12a and 12b which include curves useful in demonstrating the invention's performance when the reaction surface moves towards and against an end effector.
Figure 12B:
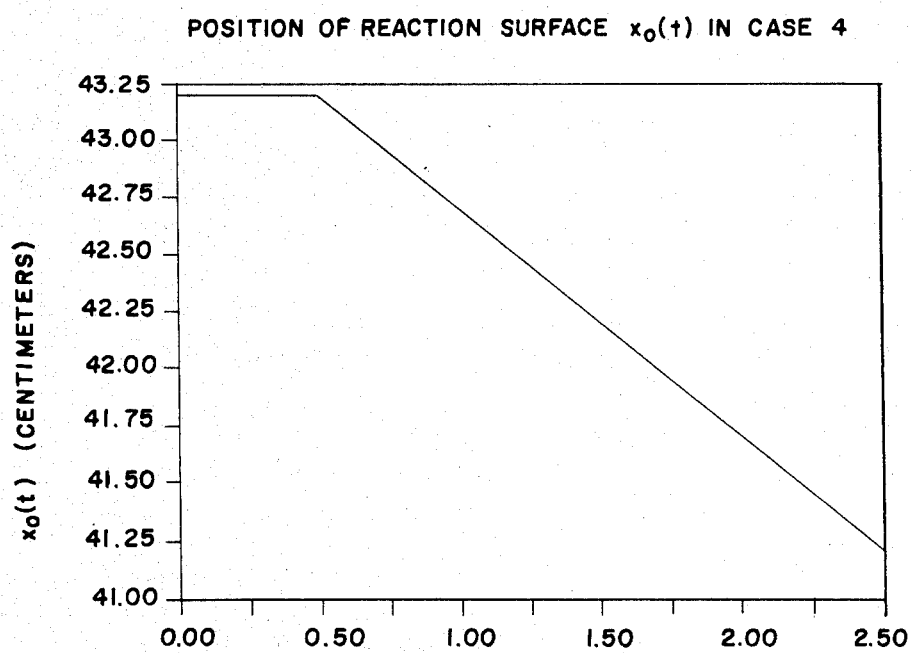

FIGS. 12a and 12b show the response of the actual force on the end-effector $P_x(t)$ and the reaction surface position $x_o(t)$. It is seen that the end-effector complies completely with the force applied by the surface and the actual end-effector force varies about the desired value of 0.1 Nt.

5. SOLUTION OF THE LYAPUNOV EQUATION

In this section, we obtain explicit closed-form solutions of the Lyapunov equation for a particular class of stable systems.

Let us consider the (3m)th order stable system $$x(t) = \begin{pmatrix} 0 & I_m & 0 \\ 0 & 0 & I_m \\ -D_1 & -D_2 & -D_3 \end{pmatrix} x(t) \quad (50)$$

where $D_1$, $D_2$ and $D_3$ are $m \times m$ diagonal matrices with positive elements such that $D_2D_3 > D_1$. Let the $3m \times 3m$ matrix $$P = \begin{pmatrix} P_1 & P_2 & P_3 \\ P_2 & P_4 & P_5 \\ P_3 & P_5 & P_6 \end{pmatrix}$$

be the symmetric positive-definite solution of the Lyapunov equation $$\begin{pmatrix} P_1 & P_2 & P_3 \\ P_2 & P_4 & P_5 \\ P_3 & P_5 & P_6 \end{pmatrix} \begin{pmatrix} 0 & I_m & 0 \\ 0 & 0 & I_m \\ -D_1 & -D_2 & -D_3 \end{pmatrix} + \begin{pmatrix} 0 & 0 & -D_1 \\ I_m & 0 & -D_2 \\ 0 & I_m & -D_3 \end{pmatrix} \quad (51)$$

$$\begin{pmatrix} P_1 & P_2 & P_3 \\ P_2 & P_4 & P_5 \\ P_3 & P_5 & P_6 \end{pmatrix} = \begin{pmatrix} -2Q_1 & 0 & 0 \\ 0 & -2Q_2 & 0 \\ 0 & 0 & -2Q_3 \end{pmatrix}$$

where $P_1, \ldots, P_6$ are $m \times m$ diagonal matrices, and $Q_1$ and $Q_2$, $Q_3$ are $m \times m$ diagonal matrices with positive elements. From equation (51), we obtain the set of equations.

$$-2P_3D_1 = -2Q_1 \quad (52a)$$

$$P_1 - P_3D_2 - P_5D_1 = 0 \quad (52b)$$

$$P_2 - P_3D_3 - P_6D_1 = 0 \quad (52c)$$
$$2P_2 - 2P_5D_2 = -2Q_2 \quad (52d)$$

$$P_3 - P_6D_2 + P_4 - D_3P_5 = 0 \quad (52e)$$

$$2P_5 - 2P_6D_3 = -2Q_3 \quad (52f)$$

The solutions of these equations for submatrices $P_3$, $P_5$, and $P_6$ are found to be $$P_3 = D_1^{-1}Q_1 \quad (53a)$$

$$P_5 = D_4^{-1}[(D_1^{-1}D_3{}^2)Q_1 + (D_3)Q_2 + (D_1)Q_3] \quad (53b)$$

$$P_6 = D_4^{-1}[(D_1^{-1}D_3)Q_1 + Q_2 + (D_2)Q_3] \quad (53c)$$

where $D_4 = D_2D_3 - D_1$. Equations 53(a)–(c) give simple closed-form expressions for certain submatrices of the solution of the Lynapunov equation (51). Different choices of $Q_1$, $Q_2$, and $Q_3$ will generate diferent solutions $P$ of the Lyapunov equation.

Often we wish to choose the matrices $Q_1$, $Q_2$, and $Q_3$ such that the acquired solution $P$ has som desired submatrices. For instance, in order to obtain a solution with $$P_3 = W_I; P_5 = W_p; P_6 = W_D \quad (54)$$

where $W_I$, $W_p$ and $W_D$ are some specified diagonal matrices, from equations 52(a)–(f), the required $Q_i$ matrices are obtained as $$Q_1 = D_1 W_I \quad (55a)$$

$$Q_2 = -D_3 W_I + D_2 W_p - D_1 W_D \quad (55b)$$

$$Q_3 = -W_p + D_3 W_D \quad (55c)$$

For the $Q_i$ matrices to be positive-definite, the following inequalitites must hold $$(D_3 W_I + D_1 W_D) < D_2 W_p < D_2 D_3 W_D \quad (56)$$

6. NON-ADAPTIVE EMBODIMENT

The adaptive position control described hereinbefore does not require knowledge of the manipulator dynamics. If such knowledge is available, the inventor has described a non-adaptive robust control scheme herein in FIG. 13b and in his paper entitled "Linear Multivariable Control of Robot Manipulators" presented to the IEEE during the week of Apr. 7th through 10th, 1986. A copy of that paper is submitted herewith and its disclosure is incorporated herein by reference pursuant to M.P.E.P. Section 608.01(p). More particularly the incorporation by reference includes the equations and material that describe the components of FIG. 13a and 13b herein and the improvement over the basic robot control scheme depicted in FIG. 13a. Both figures are described in detail in the inventor's paper.

FIG. 13b includes a feedforward loop 1300 which contains only the proportional-double-derivative terms as depicted. Feedforward controller 1300 is designed to be the inverse of the manipulator's dynamics. The feedforward terms ensure that the manipulator joints follow desired reference trajectory from a trajectory generator as earlier described.

Feedback controller 1320 of FIG. 13b is independent of the feedforward controller 1300. Although each controller 1300 and 1320 is multivariable, the feedback controller 1320 achieves pole placement and ensures zero initial tracking error by the proportional-integral-derivative terms depicted therein.

The non-adaptive controller of FIG. 13b may more readily be understood by assuming that the gain circuits of the adaptive position controller as fully described herein are set and fixed. A non-adaptive controller of FIG. 13b, as claimed, ensures position tracking in real time, and does so with a highly simplified design approach.

7. SUMMARY

A new and novel method and apparatus for achieving high speed real-time force/position control of a manipulator has been disclosed and claimed. The adaptive control law for force, as established by equation (26), is performable at high speeds in a digital hybrid control architecture. The adaptation of this invention is also, of course, readily performed in suitable analog methods and functions. Adaptive or non-adaptive position control alone, or in combination with, the adaptive force control as described and claimed herein provides new and heretofor unattained results.

The above description presents the best mode contemplated in carrying out the invention. The invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. In a hybrid controller adapted to issue a manipulator control signal which controls a manipulator's position and force in Cartesean space, wherein the manipulator and its environment form a system exhibiting dynamics which are non-linear and also include manipulator and system parameters which are not known to a user who controls the manipulator in Cartesean space through a user-initiated position and force trajectory command that is received at the hybrid controller, and wherein the hybrid controller senses force and position of said manipulator in said Cartesian space, the improvement comprising:

manipulator driving means responsive to said control signal issued by said hybrid controller for driving said manipulator in said environment to achieve, in Cartesean space said desired position and force indicated by said trajectory command received by said hybrid controller, which command is issued to said hybrid system free of a priori knowledge of any of said non-linearities and/or the manipulator's and/or system's parameters; and adaptive control means, responsive to said sensed force and position, for varying said control signal applied to said manipulator's driving means, which variable control signal compensates in real-time for the system's nonlinearities as said manipulator is driven in Cartesean space to said commanded position and force.

2. The hybrid controller in accordance with claim 1 wherein said adaptive control means is further characterized as comprising:

an adaptive force control which includes a sensed force signal feedback circuit and variable feedforward signal generating means for receiving a force command portion of said received command and modifying said force command portion by said sensed force signal of said force feedback circuit;

an adaptive position control circuit which includes a position signal feedback circuit and variable feedforward signal generating means for receiving a position command portion of said received command and modifying said position command portion by said sensed position signal of said position feedback circuit; and means for connecting both said force and position signal generating means to said manipulator driving means in order to control said manipulator's position and force exerted on said load or said environment in said Cartesian space.

3. A hybrid controller in accordance with claim 2 wherein the manipulator driving means is further characterized as including;

a signal summing junction for force control connectable to said manipulator for applying thereto a combined variable force control signal derived, at least in part, from said feedforward and adaptive feedback control loops.

4. A hybrid controller in accordance with claim 3 and further comprising:

variable gain control circuits in said adaptive force control loop; and an adaptation control responsive to signals indicative of the manipulator's actual Cartesian movements in said environment for controlling said gain control circuits in order to compensate for the system's non-linearities.

5. A hybrid controller in accordance with claim 4 and further comprising:

a position and force trajectory generator emitting force reference and/or position trajectory reference command signals; and means for comparing the desired position and/or force reference command signal(s) and an actual force signal representing the Cartesian force applied by said manipulator to said load or environment, in order to derive an error signal for application to said feedback control loops.

6. A hybrid controller in accordance with claim 5 wherein said signal summing means further comprises:

a signal summing junction for summing said desired force reference command signal with said actual manipulator Cartesian force signal to derive therefrom said real-time force control signal.

7. A hybrid controller in accordance with claim 6 and further comprising:

means connecting said feedforward loop between said position and force command generator and said signal summing junction for feeding said desired force reference signal forward to said signal summing junction.

8. A hybrid controller in accordance with claim 3 and further comprising;

proportional-integral-differential (PID) controller circuits in said feedback force control loop.

9. A hybrid controller in accordance with claim 1 and including a position and force command generator for emitting signals indicative of a desired position and force on said load and further wherein each manipulator's actual force and position applied to said load are sensed in order to derive position and force terms that are thereafter respectively represented as error signals to be fed back and used by the hybrid controller, and wherein the improvement is further characterized in that:

said adaptive control means comprises;

a signal summing means for forming said real-time force and position control signals;

a feedforward command control loop for applying said desired force and position command signals to said summing means;

an adaptive force and an adaptive position feedback control loop also connected to said summing means for respectively receiving said desired force and position command signals;

adaptation control means connected in said adaptive force and said adaptive position feedback control loops and responsive to the respective command signals thereof and also responsive to their respective actual sensed error signals for modifying the commands in real-time in accordance with said error signals; and means for applying the so-modified command signals from said adaptation control means to said summing means.

10. A hybrid controller in accordance with claim 9 and wherein said signal modifying means in said adaptive control means operates in accordance with a force control law which may be considered as though it was applied directly to the manipulator's end effector in Cartesian space, and said controller further comprises:

an adpative force proportional-integral-differential (PID) controller in said force feedback control loop;

a means connected in said force feedforward control loop for receiving a feedforward signal representing a desired mathematical force term for said manipulator; and a plurality of variable gain circuits for implementing a force control law characterized as:

$$F_z(t) = P_r(t) + d(t) + K_I(t) \int_0^t E(t)dt + K_p(t)E(t) - K_v(t) \dot{Z}(t)$$

wherein $P_r(t)$ is said desired force command signal term; $d(t)$ is, at least in part, a cross-coupling position-related compensating term; the $K_I$, $K_p$, and $K_v$ signal terms are individually varied gain control terms; E is a force error term which is obtained by modifying the desired force command signal term by the actual force signal that is sensed at the manipulator and $\dot{Z}$ is a position-related velocity damping term which represents the manipulator's velocity in Cartesian space.

11. A hybrid controller in accordance with claim 10 and wherein said signal modifying means in said adaptive control means operates in accordance with a position control law which may be considered as though it was applied directly to the manipulator's end effector in Cartesian space, and said controller further comprises:

an auxiliary force signal for controlling, at least in part, the amount of force to be applied by said manipulator; and summing means for adding said auxiliary force controlling signal in combination with signals in said adaptive force feedback and force feedforward control loops.

12. A hybrid controller in accordance with claim 1 and wherein said improvement is further characterized by:

means for compensating for dynamic cross coupling which results from adaptively controlling both position and force of said manipulator.

13. A hybrid controller in accordance with claim 1 wherein said adaptive control means further comprises;

an adaptive position controlling means including adaptive position feedforward and adaptive position feedback control loops which include a plurality of variable gain circuits for implementing a position control law characterized as:

$$F_y(t) = f(t) + \overline{K}_p(t)E_p(t) + \overline{K}_v(t)\dot{E}_p(t) + \overline{C}(t)R(t) + \overline{B}(t)\dot{R}(t) + \overline{A}(t)\ddot{R}(t)$$

wherein the term R(t) is a desired position trajectory command signal term, $E_p(t)$ is a position tracking error term, $[\overline{K}_pE_p + \overline{K}_v\dot{E}_p]$ and $[\overline{C}R + \overline{B}\dot{R} + \overline{A}\ddot{R}]$ are variable gain terms contributed by the feedback and feedforward adaptive position control loops.

14. A hybrid controller in accordance with claim 1 wherein said positioning of said load is controlled by a control law characterized as:

$$F_y(t) = f(t) + \overline{K}_p(t)E_p(t) + \overline{K}_v(t)\dot{E}_p(t) + \overline{C}(t)R(t) + \overline{B}(t)\dot{R}(t) + \overline{A}(t)\ddot{R}(t)$$

wherein the term R(t) is a desired position trajectory, $E_p(t)$ is a position tracking error, $[\overline{K}_pE_p + \overline{K}_v\dot{E}_p]$ and $[\overline{C}R + \overline{B}\dot{R} + \overline{A}\ddot{R}]$ are terms contributed by feedback and feedforward adaptive position control loops; and wherein said force control law is characterized as:

$$F_z(t) = P_r(t) + d(t) + K_I(t) \int_0^t E(t)dt + K_p(t)E(t) - K_v(t) \dot{Z}(t)$$

wherein $P_r(t)$ is said desired force reference signal term, $d(t)$ is an auxiliary force signal term emitted by said adaptation control, and the $K_I$, $K_p$, and $K_v$ are variable gain terms; E is an error term; and $\dot{Z}$ is a velocity term.

15. A hybrid controller in a system for controlling the positioning of, and force exerted by, a controlled manipulator in accordance with a received command signal, said system characterized in that the manipulator and the environment form a complex, dynamic model specified as having unknown parameter values, and the system is further characterized by:

adaptive control means for issuing a real-time variable signal to said manipulator to be controlled, which signal controls the position and force of said manipulator, said adaptive control means further comprising;

means for sensing the actual force and positioning of said manipulator as it is being controlled; and variable control signal generating means connected to said sensing means for modifying said received command by said sensed force and position in order to supply said variable control signal issued from said adaptive control means without knowledge of said parameter values of the system.

16. The hybrid controller in accordance with claim 15, and wherein said manipulator exhibits a force response on a load or on said environment and includes a force driving means that is responsive to a force command portion of said received command signal, and the improvement is further characterized by:

said adaptive control means including at least one adaptive force controller for controlling said manipulator's force driving means in the force that it applies to said load or to said environment; and said adaptive force controller includes a real-time force signal generating means for emitting a force control signal that causes said manipulator to exhibit the desired force that is indicated by said force command portion of said received command signal either independently of, or simultaneously with, said position control over said manipulator.

17. The hybrid controller in accordance with claim 16, and wherein said manipulator additionally exhibits a position response and includes a position driving means that is responsive to a position command portion of said received command signal, and the improvement is further characterized by said adaptive control means further including:

an adaptive position controller for controlling said manipulator'position driving means so that the manipulator follows a desired position; and said adaptive position controller includes a real-time position signal generating means for emitting a signal that causes said manipulator to follow the desired position that is indicated by said position portion of said command signal either independently of, or simultaneously with, said manipulator's force that is being applied to the load or to said environment.

18. A hybrid controller in accordance claim 16 wherein a force control law is executed by said adaptive force controller, which force control law is characterized as:

$$F_x(t) = P_f(t) + d(t) + K_I(t) \int_0^t E(t)dt + K_p(t)E(t) - K_v(t) Z(t)$$

wherein $P_f(t)$ is said desired force command signal term, $d(t)$ is an auxiliary force signal term emitted by said adaptation control, and the $K_I$, $K_p$, and $K_v$ signal terms are gain terms which are varied by gain control circuits in said variable control signal generating means, E is a force error term which is obtained by modifying the desired force command signal term by the actual force signal that is sensed at the manipulator and Z is a position-related velocity damping term which represents the manipulator's velocity in Cartesian space.

19. A hybrid controller in accordance with claim 18 and further comprising:
a linear adaptive position control law represented as the output signal from said adaptive position controlling means.

20. A hybrid controller in accordance with claim 15 wherein said adaptive control means further comprises:
an auxiliary signal for controlling, at least in part, the position and dynamics of said manipulator; and
summing means for adding said auxiliary signal in combination with signals representing position and dynamics in said position-controlling adaptive feedforward and feedback control loops.

21. A controller for a manipulator wherein the manipulator and the environment form a complex, dynamic model with unknown parameter values, in which there exists cross-coupling between position and force variables, the improvement characterized by:
position control means for controlling manipulator position;
force control means for controlling manipulator force; and
adaptive control means for compensating for said cross-coupling which exists between the position and force variables applied at said manipulator by said position and force control means.

22. In a hybrid controller adapted to issue a manipulator control signal which controls a manipulator's position and force in an environment, wherein the manipulator and environment form a system exhibiting dynamics which are non-linear and also include manipulator and system parameters which are not known to a user who controls the manipulator through user-initiated commands that are issued to the hybrid controller, the improvement comprising:
manipulator driving means responsive to said control signal issued by said hybrid controller for driving said manipulator in said environment in accordance with a desired position and a desired force response indicated by a command to said hybrid controller, which command is issued to said hybrid system free of a priori knowledge of any of said non-linearities and/or the manipulator's and/or system's parameters; and
adaptive control means, responsive to said command, for generating a variable control signal applied to said manipulator's driving means, which variable control signal compensates in real-time for the system's nonlinearities.

23. A hybrid controller in a system for controlling the positioning of, and force exerted by, a controlled manipulator, said system characterized in that the manipulator and the environment form a complex, dynamic model specified as having unknown parameter values, and the system is further characterized by:
adaptive control means for issuing a real-time variable signal to said manipulator that is being controlled, which signal controls the positioning and force of the manipulator, said adaptive controller further comprising;
variable control signal generating means for supplying said control signal issued by said adaptive control means without knowledge of said parameter values of the system.

24. The hybrid controller in accordance with claim 23, and wherein said manipulator exhibits a force response on a load and includes a driving means that is responsive to a force command portion of said controller's command signal, and the improvement is further characterized by:
said adaptive control means including at least one adaptive force controller for controlling said manipulator driving means in the force that it applies to the load; and
said adaptive force controller includes a real-time force signal generating means for emitting a force control signal that causes said manipulator to exhibit the desired force response that is indicated by said force command portion of said controller's command signal.

25. The hybrid controller in accordance with claim 24, and wherein each manipulator additionally exhibits a position response and includes a driving means that is responsive to a position portion of said command signal, and the improvement is further characterized by:
at least one adaptive position controller for controlling said manipulator's position driving means in order to follow the position response that the manipulator is commanded to apply to said load; and
said adaptive position controller includes a real-time position signal generating means for emitting a signal that causes said manipulator to exhibit the desired position response that is indicated by said position portion of said command signal.

26. A method for controlling a manipulator, wherein the manipulator and the environment form a complex, dynamic model with specifiable but unknown parameter values, the improvement characterized by:
implementing an adaptive position control loop to compensate for the specifiable parameter values, which control loop operates from the standpont of Cartesian space and without knowledge of said parameter values based upon a position feedback signal which is representative of the manipulator's position in said Cartesian space;
implementing an adaptive force control loop, which control loop operates from the standpoint of Cartesian space and without knowledge of said parameter values based upon a force feedback signal which is representative of the manipulator's force in said Cartesian space; and connecting both control loops to the manipulator to be controlled so that the manipulator's positioning and it's force is controlled in Cartesian space by both of said two control loops.

27. In a hybrid controller adapted to issue a control signal which moves a manipulator's position and force in an environment, wherein the manipulator and environment form a system exhibiting dynamics which are non-linear and have specifiable but unknown parameters, an improved control method comprising:

controlling said manipulator in said environment in accordance with a desired position/force response; and adaptively varying said controlling step by adaptive position control and/or adaptive force control; and compensating in real-time for the system's nonlinearities in said adaptively varying control step without foreordained knowledge of 28. A controller for a manipulator wherein the manipulator and the environment form a complex, dynamic model, the improvement characterized by:

adaptive position and adaptive force control means controlling a common load in accordance with the position and force control laws respectively identified by the following algorithms;

$$F_y(t) = f(t) + \overline{K}_p(t)E_p(t) + \overline{K}_v(t)\dot{E}_p(t) + \overline{C}(t)R(t) + \overline{B}(t)\dot{R}(t) + \overline{A}(t)\ddot{R}(t)$$

wherein the term R(t) is a desired position trajectory, $E_p(t)$ is a position tracking error term, and are terms contributed by feedback and feedforward adaptive position control loops; and wherein said force control law is characterized as:

$$F_z(t) = P_r(t) + d(t) + K_I(t)\int_0^t E(t)dt + K_p(t)E(t) - K_v(t)\dot{Z}(t)$$

wherein $P_r(t)$ is said desired force reference signal term, d(t) is an auxiliary force signal term emitted by said adaptation control, and the $K_I$, $K_p$, and $K_v$ are variable gain terms; E is an error term; and $\dot{Z}$ is a velocity term.

* * * * *

UNITED STATES PATENT AND TRADEMARK OFFICE
CERTIFICATE OF CORRECTION

PATENT NO. : 4,860,215

DATED : August 22, 1989

INVENTOR(S) : Homayoun Seraji

It is certified that error appears in the above-identified patent and that said Letters Patent is hereby corrected as shown below:

Column 1, lines 50 and 51, "proposed" should read --propose--.

Column 1, line 58, "direction" should read --directions--.

Column 4, line 4, "to" should read --of--.

Column 6, line 6, after "(t)" (second occurence) "'" should read --+--.

Column 6, line 39, "X" (second occurence) should read --$\dot{X}$--.

Column 6, line 43, "nust" should read --must--.

Column 6, line 63, "E" (third occurence) should read --$\dot{E}$--.

Column 6, line 68, "E(t)=P_r(t)-P_r(t)-P(t)" should read --E(t)=P_r(t)-P(t)--.

Column 7, line 15, "possibley" should read --possibly--.

Column 7, line 22, "B P(t)" should read --B $\dot{P}$(t)--.

Column 7, line 24, "E" should read --$\dot{E}$--.

UNITED STATES PATENT AND TRADEMARK OFFICE
CERTIFICATE OF CORRECTION

PATENT NO. : 4,860,215

DATED : August 22, 1989

INVENTOR(S) : Homayoun Seraji

It is certified that error appears in the above-identified patent and that said Letters Patent is hereby corrected as shown below:

Column 7, line 53, "E" should read --$\dot{E}$--.

Column 8, line 13, "$x_m(t)$" (first occurence) should read --$\dot{x}_m(t)$--.

Column 8, line 35, "x" (second occurence) should read --$\dot{x}$--.

Column 8, line 36, "d" should read --$\dot{d}$--.

Column 8, line 41, "K" (first, second and third occurence) should read --$\dot{K}$--.

Column 9, line 34, "K" should read --$\dot{K}$--.

Column 9, line 36, "K" should read --$\dot{K}$--.

Column 9, line 38, "K" should read --$\dot{K}$--.

Column 9, line 38, "E" (first and second occurence) should read --$\dot{E}$--.

Column 9, line 44, "E" (third occurence) should read --$\dot{E}$--.

UNITED STATES PATENT AND TRADEMARK OFFICE
CERTIFICATE OF CORRECTION

PATENT NO. : 4,860,215

DATED : August 22, 1989

INVENTOR(S) : Homayoun Seraji

It is certified that error appears in the above-identified patent and that said Letters Patent is hereby corrected as shown below:

Column 9, line 51, "$\,_0 t$" should read --$\int_0^t$--.

Column 9, line 54, "$\,_0 t$" should read --$\int_0^t$--.

Column 9, line 57, "$\,_0 t$" should read --$\int_0^t$--.

Column 9, line 60, "$\,_0 t$" should read --$\int_0^t$--.

Column 9, line 60, "E" (first and second occurence) should read --$\dot{E}$--.

Column 9, line 66, "$\,_0 t$" should read --$\int_0^t$--.

Column 9, line 66, "E" (third occurence) should read --$\dot{E}$--.

Column 10, line 6, "E" (first occurence) should read --$\dot{E}$--.

Column 10, line 6, "$[\delta_1 + \delta_2 M_5]E(t)$" should read --$[\delta_1 M_6 + \delta_2 M_5]E(t)$--.

UNITED STATES PATENT AND TRADEMARK OFFICE
CERTIFICATE OF CORRECTION

PATENT NO. : 4,860,215

DATED : August 22, 1989

INVENTOR(S) : Homayoun Seraji

It is certified that error appears in the above-identified patent and that said Letters Patent is hereby corrected as shown below:

Column 10, line 26, "Z" should read --$\dot{Z}$--.

Column 11, line 25, "(tt)" should read --(t)--.

Column 11, line 36, "Z" should read --$\dot{Z}$--.

Column 12, line 30, "$\dot{x}$" should read --$\dot{X}$--.

Column 12, line 33, "$\bar{G}$" should read --$\bar{\bar{B}}$--.

Column 12, line 34, "X" (second occurence) should read --$\dot{X}$--.

Column 12, line 46, "R" (second occurence) should read --$\dot{R}$--.

Column 12, line 51, "$\bar{A}R$" should read --$\bar{A}\ddot{R}$--.

Column 12, line 57, "$\delta$" (first and second occurence) should read --$\bar{\delta}$--.

Column 12, line 60, "K" (first and second occurence) should read --$\bar{K}$--.

Column 12, line 60, "v" (first and second occurence) should read --$\bar{v}$--.

Column 11, line 13, "Z" (first and second occurence) should read --$\dot{Z}$--.

UNITED STATES PATENT AND TRADEMARK OFFICE
CERTIFICATE OF CORRECTION

PATENT NO. : 4,860,215

DATED : August 22, 1989

INVENTOR(S) : Homayoun Seraji

It is certified that error appears in the above-identified patent and that said Letters Patent is hereby corrected as shown below:

Column 12, line 63, "K" (first and second occurence) should read --$\bar{K}$--.

Column 12, line 63, "$\eta$" (first and second occurence) should read --$\bar{\eta}$--.

Column 12, line 63, "E" (first and second occurence) should read --$\bar{E}$--.

Column 12, line 66, "C" (first and second occurence) should read --$\bar{C}$--.

Column 12, line 66, "$\mu$" (first and second occurence) should read --$\bar{\mu}$--.

Column 13, line 3, "B" (first and second occurence) should read --$\bar{B}$--.

Column 13, line 3, "$\gamma$" (first and second occurence) should read --$\bar{\gamma}$--.

Column 13, line 3, "R" (first and second occurence) should read --$\bar{R}$--.

Column 13, line 6, "A" (first and second occurence) should read --$\bar{A}$--.

UNITED STATES PATENT AND TRADEMARK OFFICE
CERTIFICATE OF CORRECTION

PATENT NO. : 4,860,215

DATED : August 22, 1989

INVENTOR(S) : Homayoun Seraji

It is certified that error appears in the above-identified patent and that said Letters Patent is hereby corrected as shown below:

Column 13, line 6, "$\lambda$" (first and second occurence) should read --$\bar{\lambda}$--.

Column 13, line 6, "R" (first and second occurence) should read --$\ddot{R}$--.

Column 13, line 12, "in" should read --In--.

Column 13, line 37, "37" should read --"--.

Column 13, line 44, after "where" should be --$\theta$--.

Column 15, line 17, "$\theta$" (second, third and fourth occurence) should read --$\dot{\theta}$--.

Column 15, line 18, "$\theta$" (second occurence) should read --$\dot{\theta}$--.

Column 15, line 19, "$\theta$" (second occurence) should read --$\dot{\theta}$--

Column 15, line 38, "$\geq$" should read --$\geq$--.

Column 15, line 66, "$K_3$" should read --$K_e$--.

Coluln 16, line 9, "$y_4$" should read --$y_r$--.

Column 16, line 13, "x" should read --+--.

UNITED STATES PATENT AND TRADEMARK OFFICE
CERTIFICATE OF CORRECTION

PATENT NO. : 4,860,215

DATED : August 22, 1989

INVENTOR(S) : Homayoun Seraji

It is certified that error appears in the above-identified patent and that said Letters Patent is hereby corrected as shown below:

Column 16, line 59, "x" (third occurence) should read $--\dot{x}--$.

Column 17, lines 10 and 11, after "$\bar{B}(t)$" should be $--\dot{Y}_r(t)--$.

Column 17, line 10, "e" (second occurence) should read $--\dot{e}--$.

Column 17, line 20, "K" should read $--\bar{K}--$.

Column 17, line 24, "K" should read $--\bar{K}--$ and "e" should read $--\ddot{e}--$.

Column 17, line 26, "C" should read $--\bar{C}--$.

Column 17, line 30, "B" should read $--\bar{B}--$ and "y" should read $--\dot{y}--$.

Column 17, line 33, "A" should read $--\bar{A}--$ and "y" should read $--\ddot{y}--$.

Column 17, line 35, "e" (second occurence) should read $--\dot{e}--$.

Column 19, line 4, "x(t)" (first occurence) should read $--\dot{x}(t)--$.

UNITED STATES PATENT AND TRADEMARK OFFICE
CERTIFICATE OF CORRECTION

PATENT NO. : 4,860,215

DATED : August 22, 1989

INVENTOR(S) : Homayoun Seraji

It is certified that error appears in the above-identified patent and that said Letters Patent is hereby corrected as shown below:

Column 23, line 17, "Z" should read --$\dot{Z}$--.

Column 23, line 56, "$\dot{E}$" should read --E--.

Column 23, line 57, "E" should read --$\dot{E}$--.

Column 23, line 57, "R" (second occurence) should read --$\dot{R}$--.

Column 23, line 57, "$\dot{R}$" should read --$\ddot{R}$--.

Column 24, line 13, "Z" should read --$\dot{Z}$--.

Column 24, line 65, "manipulator'position" should read --manipulator's position--.

Column 25, line 15, "Z" should read --$\dot{Z}$--.

Column 27, line 21, after "of" should be --said parameters.--.

UNITED STATES PATENT AND TRADEMARK OFFICE
CERTIFICATE OF CORRECTION

PATENT NO. : 4,860,215

DATED : August 22, 1989

INVENTOR(S) : Homayoun Seraji

It is certified that error appears in the above-identified patent and that said Letters Patent is hereby corrected as shown below:

Column 28, line 9, after "term," should be $--[K_p E_p + K_v \dot{E}_p]$ and $[CR + B\dot{R} + A\ddot{R}]--$.

Column 28, line 9, delete "and".

Column 28, line 17, "Z" should read $--\dot{Z}--$.

Signed and Sealed this

Ninth Day of July, 1991

Attest:

HARRY F. MANBECK, JR.

*Attesting Officer*  *Commissioner of Patents and Trademarks*